United States Patent
Kusakabe et al.

(10) Patent No.: US 11,356,663 B2
(45) Date of Patent: Jun. 7, 2022

(54) ENCODER, DECODER, ENCODING METHOD, AND DECODING METHOD

(71) Applicant: Panasonic Intellectual Property Management Co., Ltd., Osaka (JP)

(72) Inventors: Toshihiko Kusakabe, Osaka (JP); Shinji Kitamura, Kyoto (JP); Takashi Hashimoto, Hyogo (JP); Kiyofumi Abe, Osaka (JP); Hideyuki Ohgose, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/018,320

(22) Filed: Sep. 11, 2020

(65) Prior Publication Data

US 2020/0413055 A1    Dec. 31, 2020

Related U.S. Application Data

(63) Continuation of application No. PCT/JP2019/013150, filed on Mar. 27, 2019.

(30) Foreign Application Priority Data

Mar. 28, 2018  (JP) .............................. JP2018-062642

(51) Int. Cl.
*H04N 19/117* (2014.01)
*H04N 19/119* (2014.01)
(Continued)

(52) U.S. Cl.
CPC ......... *H04N 19/117* (2014.11); *H04N 19/119* (2014.11); *H04N 19/174* (2014.11); *H04N 19/176* (2014.11); *H04N 19/82* (2014.11)

(58) Field of Classification Search
CPC .. H04N 19/117; H04N 19/119; H04N 19/174; H04N 19/176; H04N 19/82; H04N 19/70; H04N 19/86
See application file for complete search history.

(56) References Cited

U.S. PATENT DOCUMENTS

| 2010/0189184 A1 | 7/2010 | Yamaguchi et al. |
| 2011/0026597 A1 | 2/2011 | Tanaka et al. |

(Continued)

FOREIGN PATENT DOCUMENTS

| JP | 11-205803 | 7/1999 |
| JP | 2011-35444 | 2/2011 |

(Continued)

OTHER PUBLICATIONS

International Search Report (ISR) dated Jun. 4, 2019 in International (PCT) Application No. PCT/JP2019/013150.

(Continued)

*Primary Examiner* — Joseph W Becker
(74) *Attorney, Agent, or Firm* — Wenderoth, Lind & Ponack, L.L.P.

(57) ABSTRACT

An encoder which encodes a picture includes processing circuitry and memory. Using the memory, the processing circuitry: splits the picture into a plurality of slice segments; encodes a plurality of blocks included in each of the plurality of slice segments; reconstructs the plurality of blocks encoded; adds, for each of the plurality of slice segments, control information to a header area of the slice segment, the control information being for controlling application of a filter to the slice segment; and applies, for each of the plurality of slice segments, the filter to a block which has been reconstructed in the slice segment, according to the control information of the slice segment.

14 Claims, 22 Drawing Sheets

(51) Int. Cl.
*H04N 19/174* (2014.01)
*H04N 19/176* (2014.01)
*H04N 19/82* (2014.01)

(56) References Cited

U.S. PATENT DOCUMENTS

2016/0100196 A1     4/2016  Wu et al.
2019/0158935 A1 *   5/2019  Denoual .............. H04N 19/167

FOREIGN PATENT DOCUMENTS

| JP | 5353532 | | 11/2013 | |
|----|---------|---|---------|---|
| JP | 2017-535167 | | 11/2017 | |
| JP | 2017535167 A | * | 11/2017 | |
| WO | 2009/044475 | | 4/2009 | |
| WO | WO-2009044475 A1 | * | 4/2009 | ........... H04N 19/136 |
| WO | 2016/057432 | | 4/2016 | |

OTHER PUBLICATIONS

Sakae Okubo, et al., "H. 265/HEVC Textbook", Impress Japan Corporation, Oct. 2013, pp. 206-208, with partial English translation (and cited in the specification).

"Series H: Audiovisual and Multimedia Systems, Infrastructure of audiovisual services—Coding of moving video", Recommendation ITU-T H.265, Dec. 2016, High efficiency video coding, ITU-T, pp. 44-46, 96, 98.

* cited by examiner

FIG. 7

| | Descriptor |
|---|---|
| picture_parameter_set_rbsp() { | |
|   pps_pic_parameter_set_id | ue(v) |
|   ... | |
|   pps_loop_filter_across_slices_enabled_flag | u(1) |
|   pps_loop_filter_across_slices_segment_disabled_flag | u(1) |
|   deblocking_filter_control_present | u(1) |
|   if( deblocking_filter_control_present ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   ... | |
|   rbsp_trailing_bits() | |
| } | |

| | Descriptor |
|---|---|
| slice_segment_header( ){ | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if(!first_slice_segment_in_pic_flag){ | |
|     if(dependent_slice_segments_enabled_flag) | |
|       dependent_slice_segment_flag | u(1) |
|     slice_segment_address | u(v) |
|   } | |
|   if(!dependent_slice_segment_flag){ | |
|     ... | |
|     if(deblocking_filter_override_enabled_flag) | |
|       deblocking_filter_override_flag | u(1) |
|     if(deblocking_filter_override_flag){ | |
|       slice_deblocking_filter_disabled_flag | u(1) |
|       if(!slice_deblocking_filter_disabled_flag){ | |
|         slice_beta_offset_div2 | se(v) |
|         slice_tc_offset_div2 | se(v) |
|       } | |
|     } | |
|     if( pps_loop_filter_across_slices_enabled_flag && | |
|       (slice_sao_luma_flag || slice_sao_chroma_flag || !slice_deblocking_filter_disabled_flag) ) | |
|       slice_loop_filter_across_slices_enabled_flag | u(1) |
|   } | |
|   if( pps_loop_filter_across_slice_segments_disabled_flag && | |
|     ( slice_sao_luma_flag || slice_sao_chroma_flag || !slice_deblocking_filter_disabled_flag) ) | |
|     slice_segment_loop_filter_across_slice_segments_disabled_flag | u(1) |
|   if( tiles_enabled_flag || entropy_coding_sync_enabled_flag) { | |
|     ... | |
|   } | |
|   ... | |
|   byte_alignment() | |
| } | |

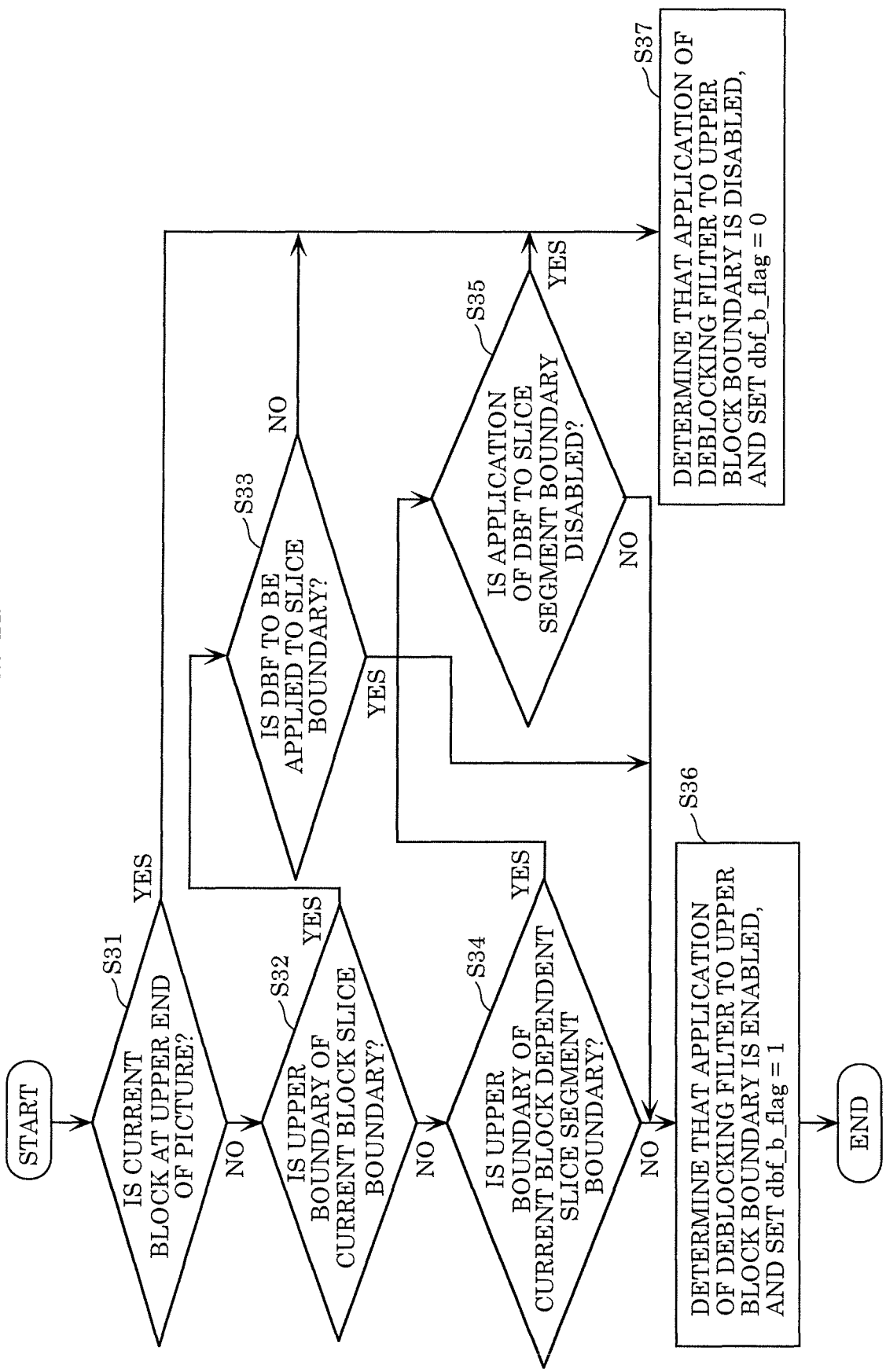

ENCODER, DECODER, ENCODING METHOD, AND DECODING METHOD

CROSS REFERENCE TO RELATED APPLICATIONS

This application is a U.S. continuation application of PCT International Patent Application Number PCT/JP2019/013150 filed on Mar. 27, 2019, claiming the benefit of priority of Japanese Patent Application Number 2018-062642 filed on Mar. 28, 2018, the entire contents of which are hereby incorporated by reference.

BACKGROUND

1. Technical Field

The present disclosure relates to an encoder which performs image encoding on image data and a decoder which performs image decoding on encoded image data.

2. Description of the Related Art

In recent years, in order to achieve Advanced Driver Assistance Systems (ADAS) such as automatic brake mechanisms and achieve automatic driving, etc., there is demand for transmitting enormous data of video captured by on-vehicle cameras or cameras installed on roads, in limited transmission bands at high quality and with short delay time.

In order to transmit such enormous video data in limited transmission bands, there is a need to perform image encoding to reduce the coding amount of the video data to be transmitted. Techniques related to such image encoding are disclosed in: Japanese Unexamined Patent Application Publication Number 11-205803 (Patent Literature 1); Publication of Japanese Patent Number 5353532 (Patent Literature 2); and H.265/HEVC Textbook (Non-patent Literature 1), written by Sakae Okubo, et. Al, pages 206 and 207, published by Impress Japan, in 2013).

SUMMARY

However, each of the techniques in the above patent literatures has a problem of not being able to appropriately reduce error propagation.

In view of this, the present disclosure provides an encoder and a decoder capable of appropriately reducing error propagation.

An encoder according to an aspect of the present disclosure is an encoder which encodes a picture and includes processing circuitry and memory. Using the memory, the processing circuitry: splits the picture into a plurality of slice segments; encodes a plurality of blocks included in each of the plurality of slice segments; reconstructs the plurality of blocks encoded; adds, for each of the plurality of slice segments, control information to a header area of the slice segment, the control information being for controlling application of a filter to the slice segment; and applies, for each of the plurality of slice segments, the filter to a block which has been reconstructed in the slice segment, according to the control information of the slice segment.

A decoder according to an aspect of the present disclosure is a decoder which decodes an encoded picture and includes processing circuitry and memory. Using the memory, the processing circuitry: reconstructs a plurality of blocks included in each of a plurality of slice segments included in the encoded picture; obtains, for each of the plurality of slice segments, control information from a header area of the slice segment, the control information being for controlling application of a filter to the slice segment; and applies, for each of the plurality of slice segments, the filter to the plurality of blocks which have been reconstructed in the slice segment, according to the control information of the slice segment.

These general and specific aspects may be implemented using a system, a method, an integrated circuit, a computer program, or a computer-readable recording medium such as a CD-ROM, or any combination of systems, methods, integrated circuits, computer programs, or computer-readable recording media. Such a recording medium may be a non-transitory recording medium.

The encoder according to the present disclosure is capable of appropriately reducing error propagation.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 is a diagram indicating one example of a syntax of a picture parameter set according to Embodiment 1;

FIG. 8 is a diagram indicating one example of a syntax of a slice segment header according to Embodiment 1;

FIG. 12 is a flow chart indicating overall determination processing as to whether to apply a deblocking filter to an upper block boundary according to Embodiment 1;

DETAILED DESCRIPTION OF THE EMBODIMENTS

Underlying Knowledge Forming Basis of the Present Disclosure

The Inventors found that the conventional encoding methods described in the "Description of the Related Art" section entail the following problem.

In the normal image encoding, a picture type is selected for each picture, and the picture is encoded according to the type. Picture types include "I-picture" in which intra frame encoding is performed and "P-picture" in which inter frame encoding is performed. Here, an I-picture requires a large coding amount compared to a P-picture. This causes a problem that it takes long time to transmit the I-picture, resulting in a long delay.

In order to solve the problem, a method of refreshing at intra slices is used (for example, see Patent Literature 1).

Figure 1:
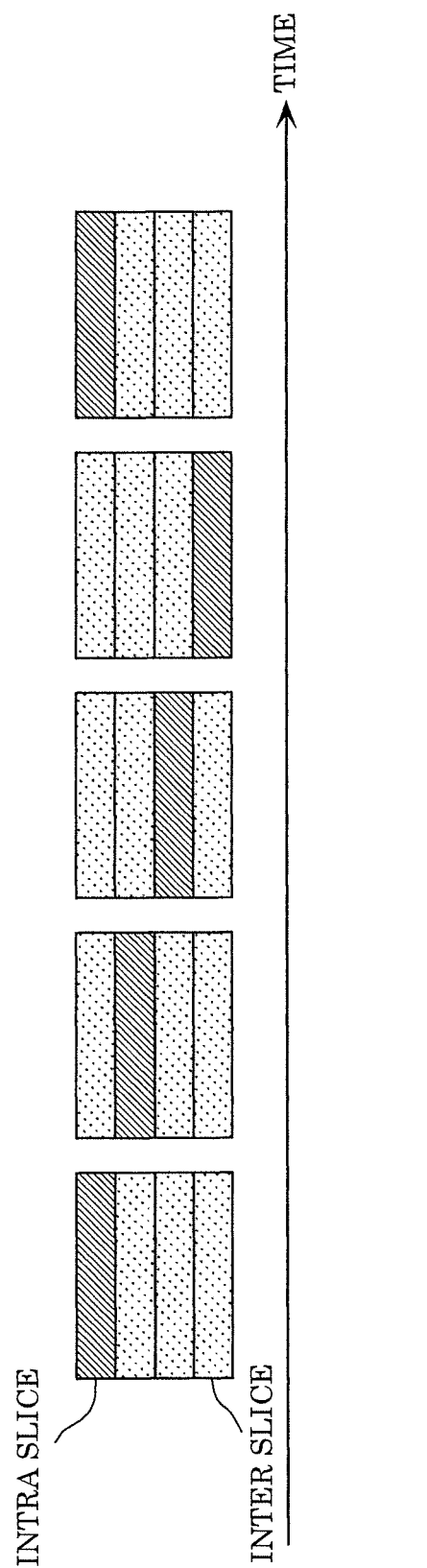
FIG. 1 is a diagram illustrating a method of refreshing at intra slices according to Patent Literature 1.

FIG. 1 is a diagram illustrating the method of refreshing at intra slices according to Patent Literature 1. One picture includes an intra slice in which intra frame prediction is performed and an inter slice in which inter frame prediction is performed. As switching between pictures to be encoded goes on, the position of an intra slice in each of pictures changes in a downward vertical direction, specifically an intra slice in a current picture to be encoded is located lower with respect to an intra slice in a picture which has been encoded immediately before. In this way, the method of refreshing at intra slices makes it possible to equalize the coding amounts of respective pictures and thus to transmit encoded video data with a short delay time. It is to be noted that the method of refreshing at intra slices is also referred to as a Cyclic Intra Refresh (CIR).

However, in the case of the method of refreshing at intra slices, there is a problem that a transmission error when occurred propagates inevitably. In connection with this, there is a method of preventing error propagation due to motion prediction processing and deblocking filtering by restricting a motion vector search range (for example, see Patent Literature 2).

Figure 2:
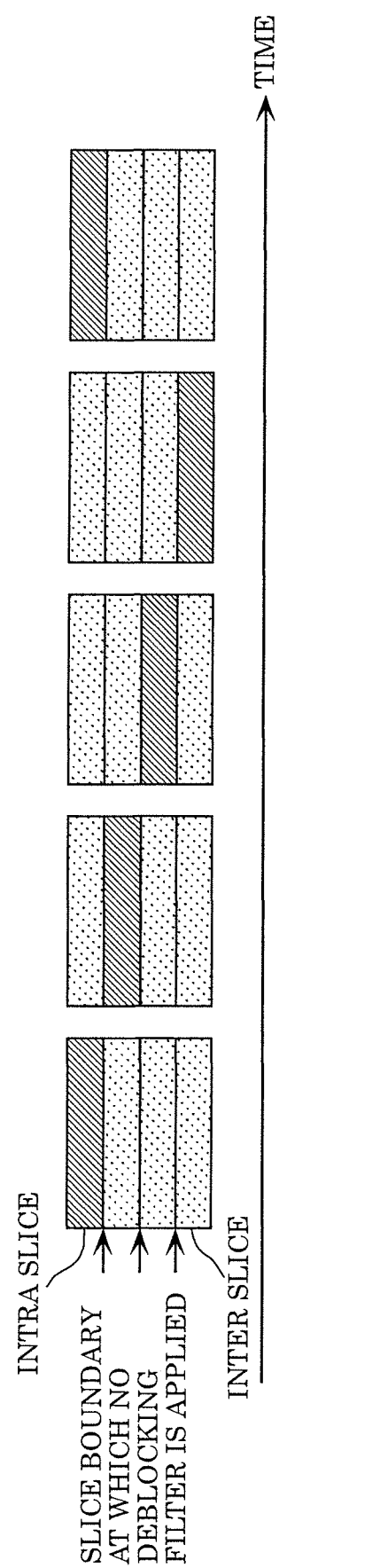
FIG. 2 is a diagram illustrating a method of refreshing at intra slices according to Patent Literature 2. This method reduces error propagation.

FIG. 2 is a diagram illustrating the method of refreshing at intra slices according to Patent Literature 2. Patent Literature 2 discloses the method of preventing error propagation due to the influence of a deblocking filter by setting disable_deblocking_filter_idc=2 as a flag in a slice header to make a setting for not applying the deblocking filter to a slice boundary.

In the case of the method of refreshing at intra slices, when the number of slices is large, the coding amount of the slice header included at the beginning of each slice increases, causing a problem that the coding efficiency decreases. In connection with this problem, it is possible to reduce decrease in coding efficiency by using dependent slices newly introduced in the High Efficiency Video Coding (HEVC) which is a new image coding standard. More specifically, a slice header of an independent slice immediately before a current dependent slice can be copied for the dependent slice, which makes it possible to reduce the coding amount required for the slice header of the dependent slice. Accordingly, it is possible to reduce decrease in coding efficiency by increasing the number of slices. It is to be noted that the independent slice is also referred to as an independent slice segment, and the dependent slice is also referred to as a dependent slice segment. In addition, the number of slices is the number of slices or slice segments obtained by splitting a picture.

However, when the method of Patent Literature 2 is applied to a dependent slice, for example, it is impossible to disable application of a deblocking filter only at one dependent slice boundary. Accordingly, in order to prevent error propagation, there is a need to disable application of the deblocking filter to all the pixels, which causes a problem that the image quality decreases.

The present disclosure has been made to solve the above-described conventional problem, and provides an encoder capable of reducing error propagation without decreasing a coding efficiency and an image quality.

An encoder according to an aspect of the present disclosure is an encoder which encodes a picture and includes processing circuitry and memory. Using the memory, the processing circuitry: splits the picture into a plurality of slice segments; encodes a plurality of blocks included in each of the plurality of slice segments; reconstructs the plurality of blocks encoded; adds, for each of the plurality of slice segments, control information to a header area of the slice segment, the control information being for controlling application of a filter to the slice segment; and applies, for each of the plurality of slice segments, the filter to a block which has been reconstructed in the slice segment, according to the control information of the slice segment. For example, each of the plurality of slice segments may be one of (i) an independent slice segment and (ii) at least one dependent slice segment that is dependent on the independent segment, the independent slice segment and the at least one dependent segment being included in the slice included in the picture.

In this way, it is possible to control application of the filter to each of the slice segments such as the independent slice segment and the dependent slice segments. Accordingly, it is possible to control application of the filter in a unit smaller than the unit in the case of controlling application of the filter to each of the slices including a plurality of slice segments. For example, it is possible to disable application of a filter only to an intra slice segment boundary in a slice and enable application of a filter to the other slice segment boundaries in the slice. As a result, even in the case of using the method of refreshing at intra slice segments, it is possible to appropriately reduce error propagation while reducing decrease in image quality. In addition, it is possible to copy and use the header of the independent slice segment for the dependent slice segments among the plurality of slice segments, and thus it is possible to reduce decrease in coding efficiency even when the number of slice segments included in the picture is large. Accordingly, it is possible to reduce error propagation without decreasing the encoding efficiency and the image quality.

In addition, the control information may indicate whether to apply a deblocking filter to a boundary of the slice segment corresponding to the control information.

With this, it is possible to reduce distortion in an image in the slice segment boundary when the deblocking filter is applied.

In addition, the control information may indicate whether to apply a sample adaptive offset to a boundary of the slice segment corresponding to the control information.

In this way, when the sample adaptive offset is applied, it is possible to make the decoded image obtained by decoding each encoded block closer to the original image.

In addition, the control information may indicate whether to apply a deblocking filter to at least one of a boundary of the slice segment corresponding to the control information and a boundary between the plurality of blocks included in the slice segment.

In this way, application of the deblocking filter is controlled not only at the slice segment boundary but also inside the slice segment, and thus it is possible to reduce error propagation without decreasing the coding efficiency.

In addition, the picture may be one of a plurality of pictures included in a video, each of the plurality of pictures may include an I-slice segment, and a position of the I-slice segment in the picture may change cyclically across the plurality of pictures, in encoding order of the plurality of pictures. When the control information is added, the control information which indicates that no filter is to be applied to a boundary between the slice segment corresponding to the control information and the I-slice segment may be added to the header area of the slice segment.

In this way, it is possible to appropriately reduce error propagation even when the method of refreshing at intra slice segments, that is, Cyclic Intra Refresh (CIR) is used.

In addition, an encoder according to another aspect of the present disclosure is an encoder which encodes a picture and includes: a splitter which splits the picture into a plurality of slice segments; an encoding unit which encodes a plurality of blocks included in each of the plurality of slice segments; a reconstructor which reconstructs the plurality of blocks encoded; a header processor which adds, for each of the plurality of slice segments, control information to a header area of the slice segment, the control information being for controlling application of a filter to the slice segment; and a filter unit which applies, for each of the plurality of slice segments, the filter to a block which has been reconstructed in the slice segment, according to the control information of the slice segment.

In this way, it is possible to reduce error propagation without decreasing the encoding efficiency and the image quality.

In addition, a decoder according to an aspect of the present disclosure is a decoder which decodes an encoded picture and includes processing circuitry and memory. Using the memory, the processing circuitry reconstructs a plurality of blocks included in each of a plurality of slice segments included in the encoded picture; obtains, for each of the plurality of slice segments, control information from a header area of the slice segment, the control information being for controlling application of a filter to the slice segment; and applies, for each of the plurality of slice segments, the filter to the plurality of blocks which have been reconstructed in the slice segment, according to the control information of the slice segment. For example, each of the plurality of slice segments is one of (i) an independent slice segment and (ii) at least one dependent slice segment that is dependent on the independent segment, the independent slice segment and the at least one dependent segment being included in the slice included in the picture.

In this way, it is possible to control application of the filter to each of the slice segments such as the independent slice segment and the dependent slice segments. Accordingly, it is possible to control application of the filter in a unit smaller than the unit in the case of controlling application of the filter to each of the slices including a plurality of slice segments. For example, it is possible to disable application of a filter only to intra slice segment boundaries in a slice and enable application of a filter to the other slice segment boundaries in the slice. As a result, even in the case of using the method of refreshing at intra slice segments, it is possible to appropriately reduce error propagation while reducing decrease in image quality. In addition, it is possible to copy and use the header of the independent slice segment for the dependent slice segments among the plurality of slice segments, and thus it is possible to reduce decrease in coding efficiency even when the number of slice segments included in the picture is large. Accordingly, it is possible to reduce error propagation without decreasing the encoding efficiency and the image quality.

In addition, the control information may indicate whether to apply a deblocking filter to a boundary of the slice segment corresponding to the control information.

With this, it is possible to reduce distortion in an image in the slice segment boundary when the deblocking filter is applied.

In addition, the control information may indicate whether to apply a sample adaptive offset to a boundary of the slice segment corresponding to the control information.

In this way, when the sample adaptive offset is applied, it is possible to make the decoded image obtained by decoding each encoded block closer to the original image.

In addition, the control information may indicate whether to apply a deblocking filter to at least one of a boundary of the slice segment corresponding to the control information and a boundary between the plurality of blocks included in the slice segment.

In this way, application of the deblocking filter is controlled not only at the slice segment boundary but also inside the slice segment, and thus it is possible to reduce error propagation without decreasing the coding efficiency.

In addition, the encoded picture may be one of a plurality of encoded pictures included in a bitstream. Each of the plurality of pictures may include an I-slice segment, and a position of the I-slice segment in the picture may change cyclically across the plurality of pictures, in decoding order of the plurality of pictures. When the control information is obtained, the control information which indicates that no filter is to be applied to a boundary between the slice segment corresponding to the control information and the I-slice segment may be obtained from the header area of the slice segment.

In this way, it is possible to appropriately reduce error propagation even when the method of refreshing at intra slice segments, that is, Cyclic Intra Refresh (CIR) is used.

In addition, a decoder according to an aspect of the present disclosure is a decoder which decodes an encoded picture and includes: a reconstructor which reconstructs a plurality of blocks included in each of a plurality of slice segments included in the encoded picture; a header processor which obtains, for each of the plurality of slice segments, control information from a header area of the slice segment, the control information being for controlling application of a filter to the slice segment; and a filter unit which applies, for each of the plurality of slice segments, the filter to the plurality of blocks which have been reconstructed in the slice segment, according to the control information of the slice segment.

In this way, it is possible to reduce error propagation without decreasing the encoding efficiency and the image quality.

Hereinafter, embodiments are described with reference to the drawings.

It is to be noted that each of the exemplary embodiments described below indicates a generic or specific example. The numerical values, shapes, materials, constituent elements, the arrangement and connection of the constituent elements, steps, the processing order of the steps etc. indicated in the following exemplary embodiments are mere examples, and therefore do not limit the scope of the present disclosure. Among the constituent elements in the following exemplary embodiments, constituent elements not recited in any one of the independent claims that define the most generic concept are described as optional constituent elements.

Each of the drawings is a schematic diagram, and thus is not always illustrated precisely. In addition, the same constituent components are assigned with the same numerical references in the drawings.

Embodiment 1

Figure 3:
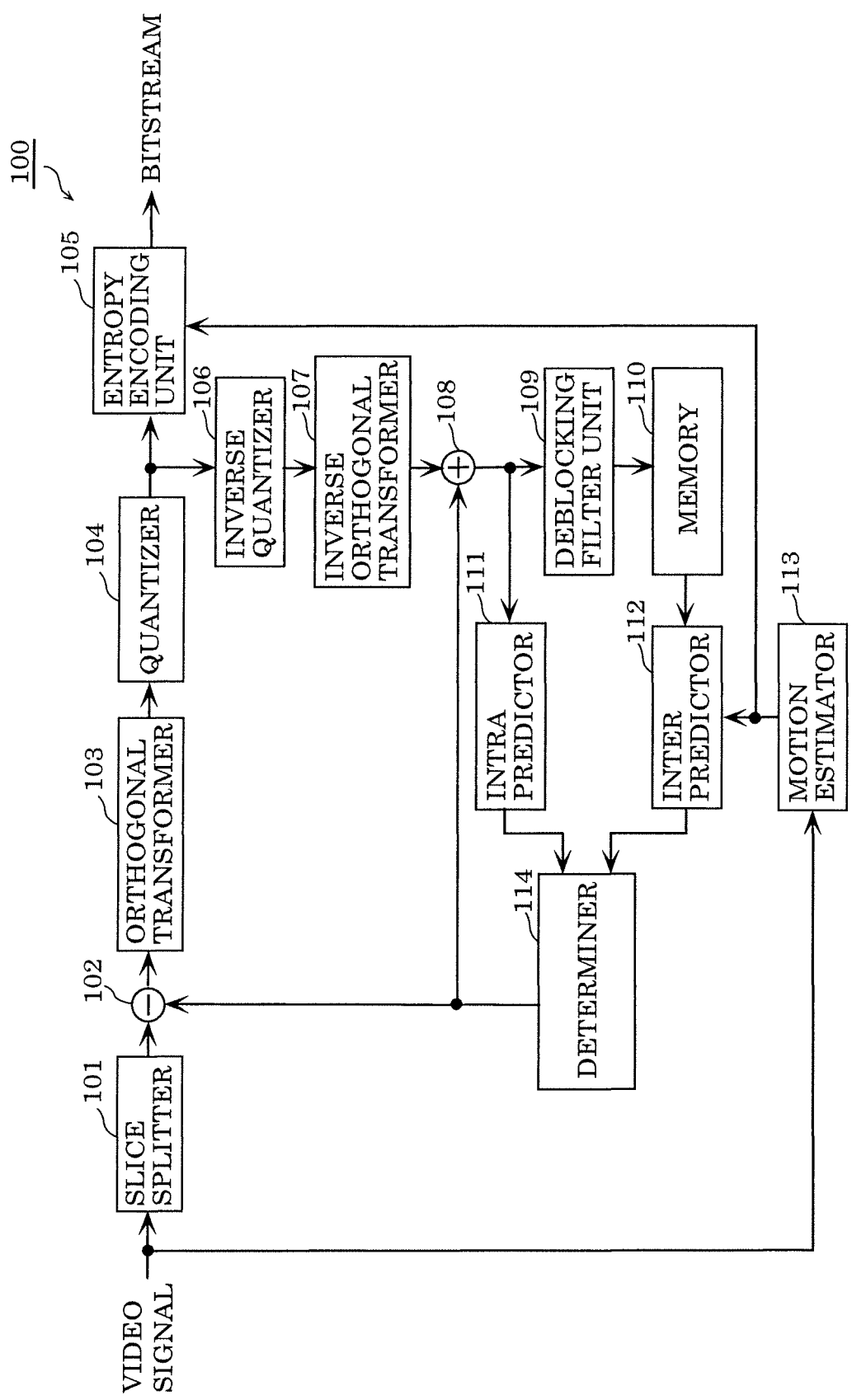
FIG. 3 is a block diagram illustrating an encoder according to Embodiment 1.

FIG. 3 is a block diagram illustrating a configuration of an encoder according to this embodiment.

Encoder 100 according to this embodiment is an apparatus capable of appropriately reducing error propagation. Encoder 100 includes slice splitter 101, subtractor 102, orthogonal transformer 103, quantizer 104, entropy encoding unit 105, inverse quantizer 106, inverse orthogonal transformer 107, adder 108, deblocking filter unit 109, memory 110, intra predictor 111, inter predictor 112, motion estimator 113, and determiner 114.

Slice splitter 101 obtains a video signal including a plurality of pictures, and splits the picture into a plurality of slices or slice segments. Here, each of the plurality of slice segments is one of (i) an independent slice segment and (ii) at least one dependent slice segment that is dependent on the independent segment, the independent slice segment and the at least one dependent segment being included in the slice included in the picture.

Subtractor 102 obtains the plurality of slices or slice segments, and obtains a prediction image from determiner 114. Subtractor 102 then generates a differential image by subtracting the prediction image from a block which is a target of encoding (hereinafter referred to as a current block) among the plurality of slices or slice segments. The block corresponds to, for example, a Coding Tree Unit (CTU), a Coding Unit (CU), a Prediction Unit (PU), or a Transform Unit (TU).

Orthogonal transformer 103 performs orthogonal transform (frequency transform) such as cosine transform on the differential image generated by subtractor 102 to transform the differential image into a coefficient sequence of a plurality of frequency coefficients. Quantizer 104 generates the quantized coefficient sequence by quantizing the plurality of frequency coefficients included in the coefficient sequence.

Inverse quantizer 106 performs inverse quantization on the coefficient sequence quantized by quantizer 104. Inverse orthogonal transformer 107 performs inverse orthogonal transform (inverse frequency transform) such as inverse discrete cosine transform on the plurality of frequency coefficients included in the coefficient sequence inverse quantized to generate a decoded differential image.

Adder 108 obtains a prediction image from determiner 114, adds the prediction image and the decoded differential image generated by inverse orthogonal transformer 107 to generate a local decoded image (reconstructed image). In this way, the encoded block is reconstructed.

Deblocking filter unit 109 removes a block distortion in the local decoded image generated by adder 108, and stores the local decoded image in memory 110. In addition, deblocking filter unit 109 according to this embodiment applies, to each of the plurality of slice segments, a filter on the block which has been reconstructed in the slice segment, according to control information of the slice segment. The filter is a deblocking filter in this embodiment. In addition, the control information indicates whether to apply a deblocking filter to the slice segment boundary corresponding to the control information.

Memory 110 is a memory for storing a local decoded image as a reference image at the time of inter prediction. It is to be noted that memory 110 is used as a decoded picture buffer (DPB).

Intra predictor 111 performs intra prediction on the current block using the local decoded image generated by adder 108 to generate a prediction image (intra prediction image).

Motion estimator 113 estimates a motion vector for the current block included in the video signal, and outputs the estimated motion vector to inter predictor 112 and entropy encoding unit 105.

Inter predictor 112 refers to an image stored in memory 110 as a reference image, and performs motion compensation on the current block using the motion vector estimated by motion estimator 113. Inter predictor 112 performs such motion compensation, that is, inter prediction for the current block to generate a prediction image (inter prediction image) of the current block.

Determiner 114 determines whether to perform intra prediction encoding or inter prediction encoding on the current block. Here, when intra prediction encoding is performed on the current block, determiner 114 outputs the prediction image (intra prediction image) generated by intra predictor 111 to subtractor 102 and adder 108. When inter prediction encoding is performed on the current block, determiner 114 outputs the prediction image (intra prediction image) generated by inter predictor 112 to subtractor 102 and adder 108.

Entropy encoding unit 105 performs entropy encoding (variable length encoding) on the coefficient sequence quantized by quantizer 104 and the motion vector estimated by motion estimator 113 to generate a bitstream.

Figure 4:
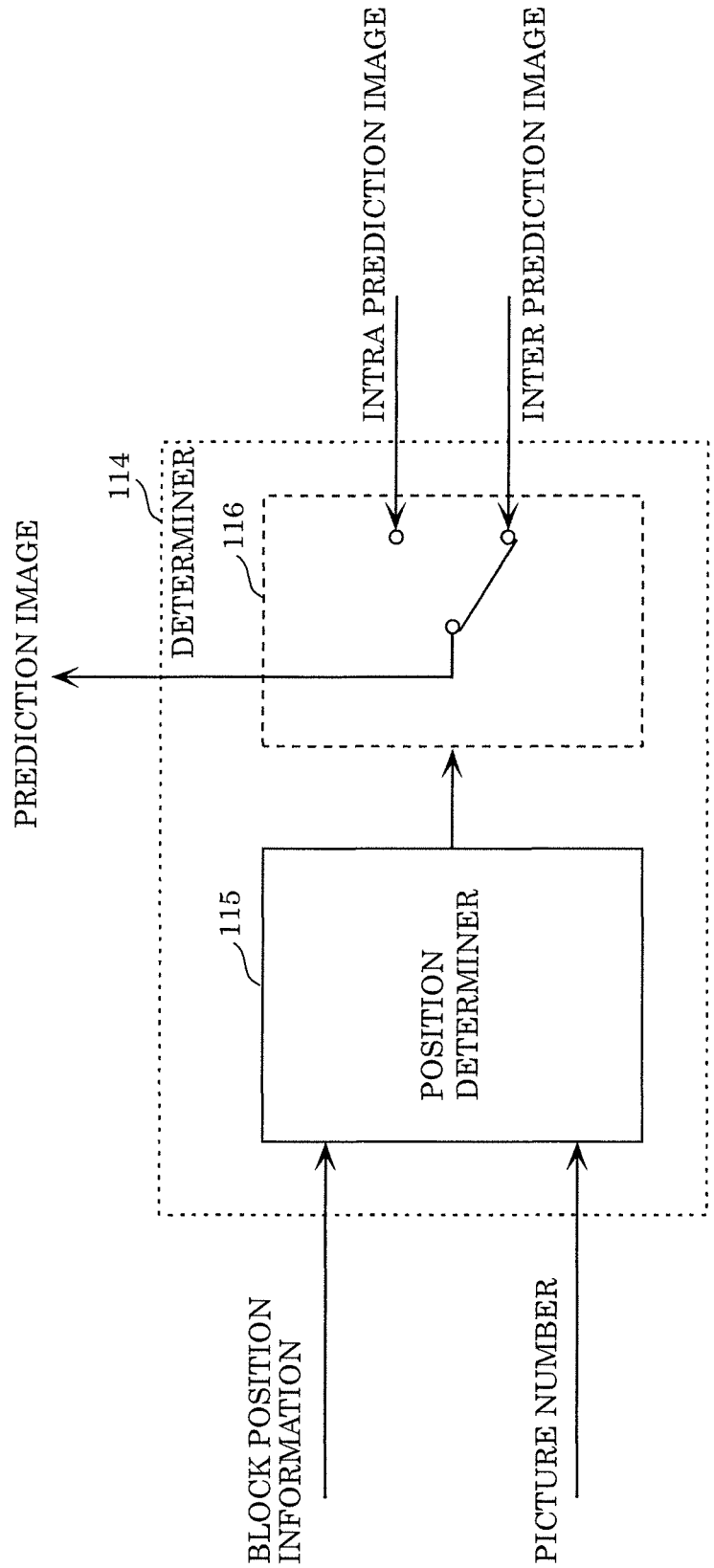
FIG. 4 is a block diagram illustrating a determiner according to Embodiment 1.

FIG. 4 is a block diagram illustrating a configuration of determiner 114.

Determiner 114 includes position determiner 115 and switch 116.

Position determiner 115 determines whether the current block is included in an intra slice or an intra slice segment, based on block position information and a picture number. The block position information indicates the position of the current block in the picture. The picture number is an identification number of the picture including the current block. When the current block is included in an intra slice or an intra slice segment, position determiner 115 then controls switch 116 so that the current block is subjected to intra prediction encoding.

When the current block is subjected to intra encoding, switch 116 outputs the intra prediction image generated by intra predictor 111 as the prediction image. When the current block is subjected to inter encoding, switch 116 outputs the inter prediction image generated by inter predictor 112 as the prediction image.

Figure 5:
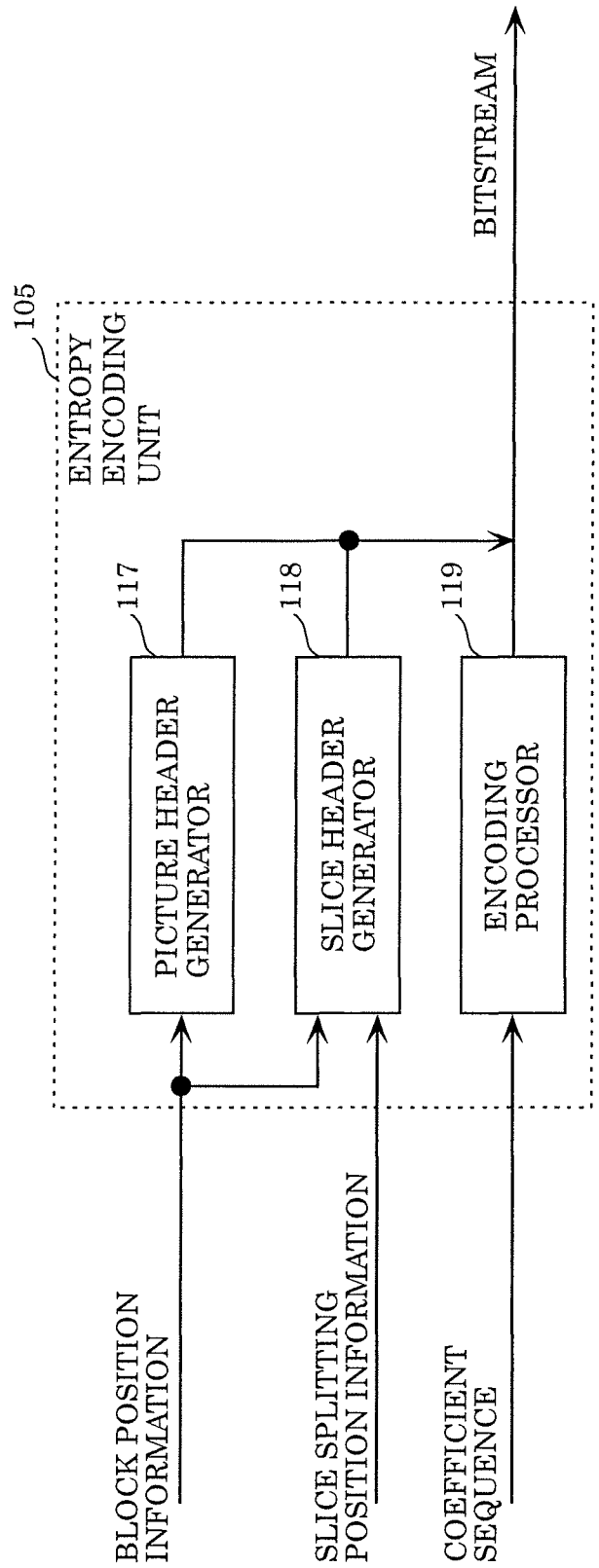
FIG. 5 is a block diagram illustrating an entropy encoding unit according to Embodiment 1.

FIG. 5 is a block diagram illustrating a configuration of entropy encoding unit 105.

Entropy encoding unit 105 includes picture header generator 117, slice header generator 118, and encoding processor 119.

Picture header generator 117 obtains block position information, and determines whether the current block is located at the beginning of the picture, based on the block position information.

When the current block is located at the beginning of the picture, picture header generator 117 adds a first slice-control flag to a picture parameter set. The first slice-control flag indicates whether a second slice-control flag for controlling a deblocking filter on a slice boundary is included in a slice header or a slice segment header.

Likewise, when the current block is located at the beginning of the picture, picture header generator 117 adds a first segment-control flag to the picture parameter set. The first segment-control flag indicates whether a second segment-control flag for controlling a deblocking filter on a slice segment boundary is included in a slice segment header.

In this way, a bitstream including a picture parameter set to which the first slice-control flag and the first segment-control flag are added is output from entropy encoding unit 105.

Slice header generator 118 obtains the block position information and the slice splitting position information. Slice splitting position information indicates the position of each of the plurality of slices or slice segments in a picture. Slice header generator 118 determines whether the current block is located at the beginning of the slice or slice segment, based on the block position information and the slice position information.

When the current block is located at the beginning of a slice, slice header generator 118 adds, to the slice header, a second slice-control flag for controlling a deblocking filter on a slice boundary. In other words, slice header generator 118 adds, to the header area of the slice, control information for controlling application of the filter to the slice, that is, the second slice-control flag described above. It is to be noted that when the slice is split into a plurality of slice segments, slice header generator 118 may add the second slice control flag to the slice segment header that is the header area of each of the slice segment included in the slice.

Likewise, when the current block is located at the beginning of the slice segment, slice header generator 118 adds, to the slice segment header, the second segment-control flag for controlling the deblocking filter at a slice segment boundary. In other words, slice header generator 118 adds, to the header area of the slice segment, control information for controlling application of the filter to the slice segment, that is, the second segment-control flag described above.

In this way, a bitstream including a slice segment header to which the second slice-control flag and the second segment-control flag are added is output from entropy encoding unit 105.

Encoding processor 119 performs entropy encoding on the coefficient sequence output from quantizer 104, and outputs a bitstream including the coefficient sequence entropy encoded.

Figure 6:
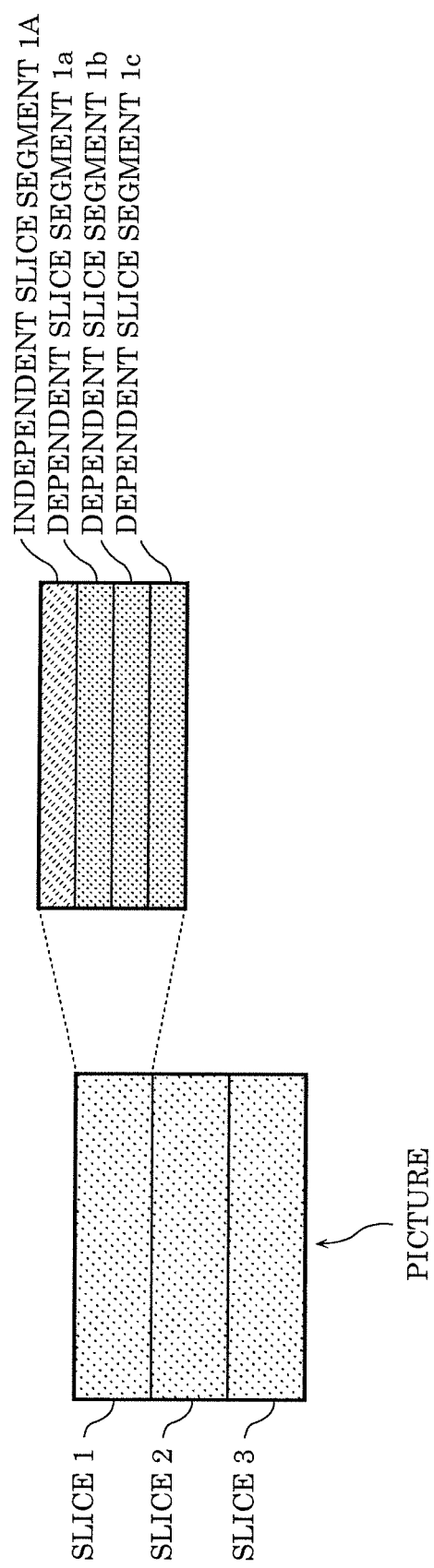
FIG. 6 is a diagram illustrating a plurality of slice segments according to Embodiment 1.

FIG. 6 is a diagram illustrating one example of a plurality of slice segments included in the picture encoded by encoder 100 according to this embodiment.

The encoded picture is split into a plurality of slices. In the example illustrated in FIG. 6, one picture is split into three slices. The slice boundary is a boundary between slices adjacent to each other. In the example of FIG. 6, a slice boundary is present between slice 1 and slice 2, and a slice boundary is present between slice 2 and slice 3.

The slice is further split into a plurality of slice segments. There are two types of slice segments. One of the two types is "independent slice segment" and the other is "dependent slice segment". A slice includes one independent slice segment and a plurality of dependent slice segments. In the example illustrated in FIG. 6, slice 1 is split into one independent slice segment 1A and three dependent slice segments 1a, 1b, and 1c. A slice segment boundary is a boundary between slice segments adjacent to each other in the slice. In other words, the slice segment boundary does not coincide with a slice boundary. In the example of FIG. 6, in slice 1, slice segment boundaries are present between independent slice segment 1A and dependent slice segment 1a, between dependent slice segment 1a and dependent slice segment 1b, and dependent slice segment 1b and dependent slice segment 1c.

The independent slice segment and the dependent slice segments correspond to independent slice data and dependent slice data of Non-patent Literature 1. More specifically, the independent slice segment and the dependent slice segments have features described below.

Each of the independent slice segment and the dependent slice segments includes a slice header (specifically, a slice segment header). Accordingly, these slice segments are included in a NAL unit. However, the amount of the syntax information included in the slice header of each dependent slice segment is smaller than the amount of syntax information included in the slice header of the independent slice segment. Accordingly, in the decoding of the dependent slice segment, most part of the syntax information included in the slice header of the independent slice segment is copied and used. In this way, the decoder cannot decode the dependent slice segment independently, and require the slice header of the independent slice segment to decode the dependent slice segment.

FIG. 7 is a diagram illustrating one example of a syntax of the picture parameter set included in the bitstream generated by encoding by encoder 100 according to this embodiment.

As indicated in syntax 700 in FIG. 7, picture header generator 117 adds the first segment-control flag to the picture parameter set. The first segment-control flag is, for example, pps_loop_filter_across_slice_segment_disabled_flag.

FIG. 8 is a diagram illustrating one example of a syntax of the picture parameter set included in the bitstream generated by encoding by encoder 100 according to this embodiment.

As indicated in syntax 800 in FIG. 8, slice header generator 118 adds, to the slice segment header, the second segment-control flag for controlling application of the deblocking filter to the slice segment boundary. The second segment-control flag is, for example, slice_segment_loop_filter_across_slice_segments_disabled_flag. When the second segment-control flag has been set to 1, deblocking filter unit 109 does not apply the deblocking filter to the slice segment boundary having the second segment-control flag.

It is to be noted that the syntax of the slice segment header indicated in FIG. 8 is one example of the syntax of the header area of the dependent slice segment. The slice segment header of the independent slice segment includes a larger amount of information than the syntax indicated in FIG. 8.

Figure 9:
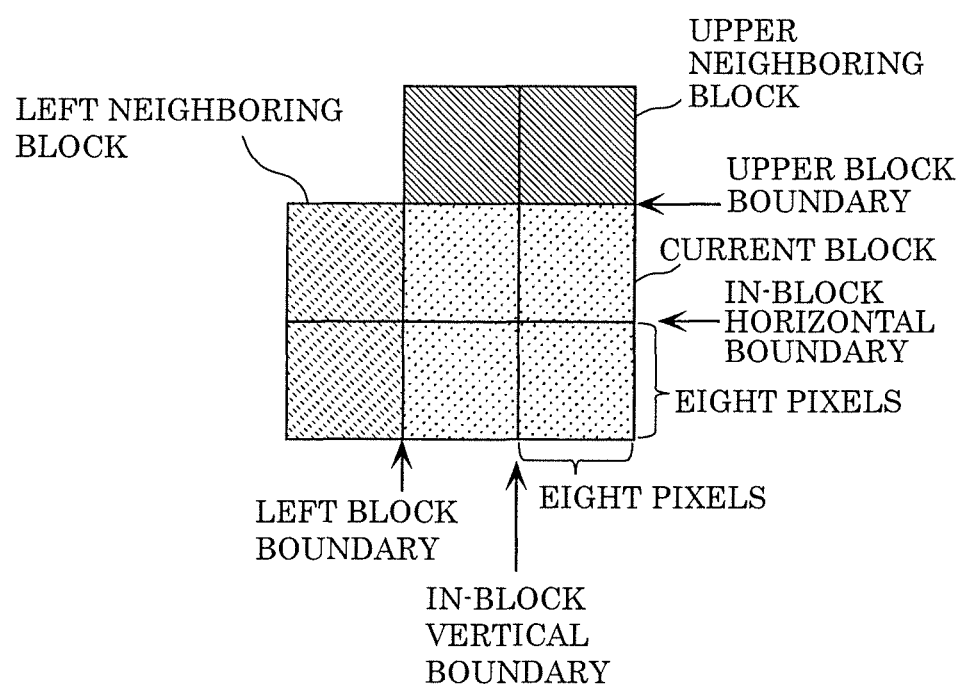
FIG. 9 is a diagram illustrating a boundary between blocks to which a deblocking filter is to be applied according to Embodiment 1.

FIG. 9 is a diagram illustrating the boundaries of a current block to which a deblocking filter is to be applied by deblocking filter unit 109 of encoder 100 according to this embodiment.

As indicated in FIG. 9, for example, the current block includes four sub-blocks each having an 8×8 pixel size. Deblocking filter unit 109 determines whether application of the deblocking filter to the horizontal boundary and the vertical boundary between sub-blocks in the current block is enabled or disabled. The horizontal boundary and the vertical boundary are also referred to as an in-block horizontal boundary and an in-block vertical boundary, respectively. The horizontal boundary and the vertical boundary are collectively referred to as in-block boundaries.

Furthermore, deblocking filter unit 109 determines whether application of the deblocking filter to the left block boundary located at the boundary between the current block and the left neighboring block is enabled or disabled. The left neighboring block is a block adjacent to the left of the current block, and may include a plurality of sub-blocks. Deblocking filter unit 109 further determines whether application of the deblocking filter to the upper block boundary located at the boundary between the current block and the upper neighboring block is enabled or disabled. The upper neighboring block is a block adjacent above the current block, and may include a plurality of sub-blocks.

Figure 10:
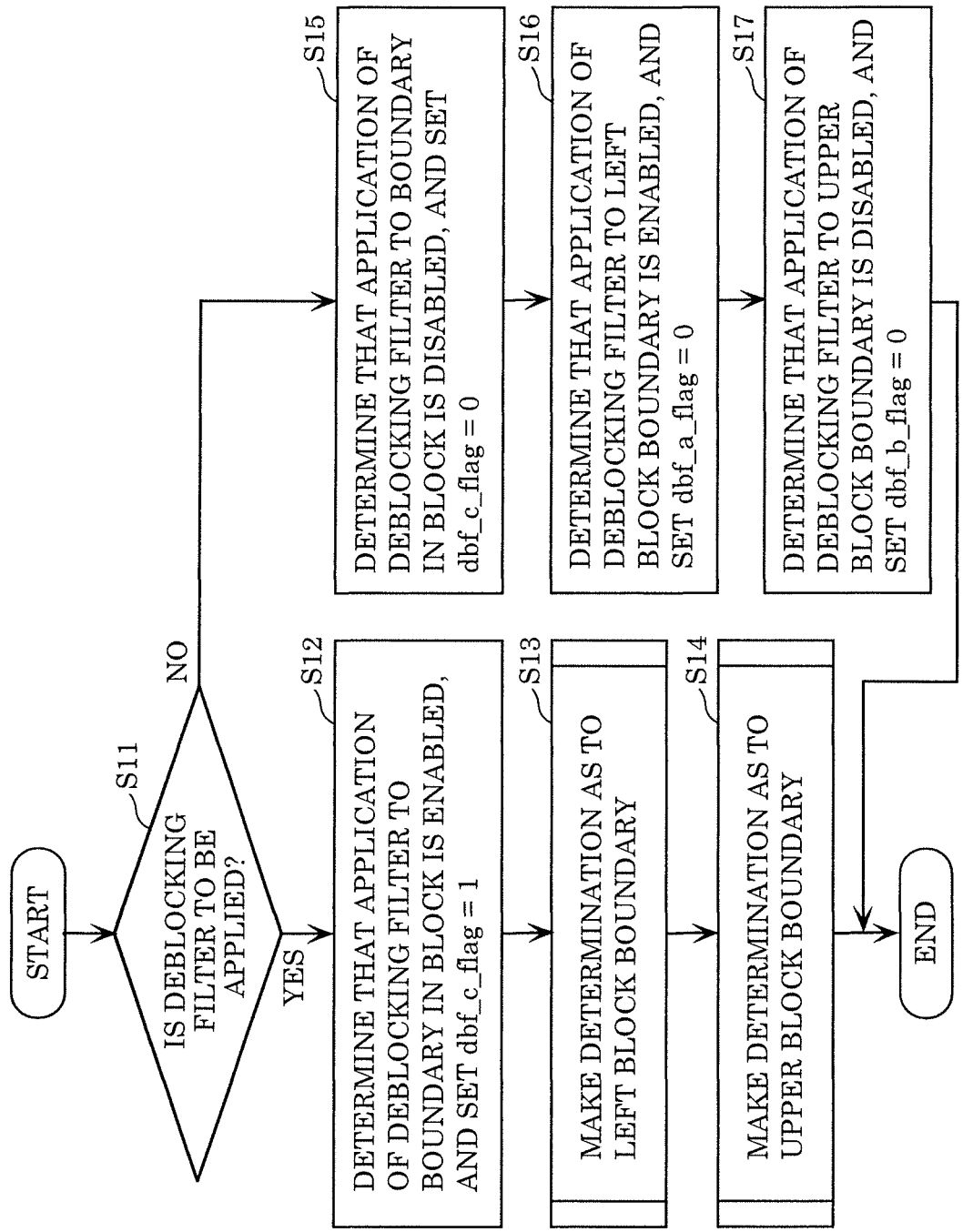
FIG. 10 is a flow chart indicating overall determination processing as to deblocking filtering according to Embodiment 1.

FIG. 10 is a flow chart indicating overall determination flow as to deblocking filtering performed by deblocking filter unit 109 of encoder 100 according to Embodiment 1. More specifically, the flow chart indicated in FIG. 10 indicates the determination flow of determining whether to apply the deblocking filter to each of the boundaries of the current block.

First, deblocking filter unit 109 determines whether to apply the deblocking filter to any of the boundaries of the current block (Step S11). For example, deblocking filter unit 109 determines whether to apply the deblocking filter by referring to a first DBF-control flag in the picture parameter set and a second DBF-control flag in the slice segment header. The first DBF-control flag is pps_deblocking_filter_disabled_flag indicated in FIG. 7.

The second DBF-control flag is slice_deblocking_filter_disabled_flag indicated in FIG. 8. For example, when 1 has been set to the first DBF-control flag and 1 is set to the second DBF-control flag, deblocking filter unit 109 determines not to apply the deblocking filter to each of the boundaries of the current block.

When it is determined that the deblocking filter is to be applied in Step S11 (Yes in Step S11), deblocking filter unit 109 sets 1 to the in-block control flag (Step S12). The in-block control flag is a flag indicating whether application of the deblocking filter to the in-block boundary is enabled or disabled. The flag dbf_c_flag, for example. The in-block control flag which has been set to 1 indicates that application of the deblocking filter is enabled. In other words, in Step S12, deblocking filter unit 109 determines that application of the deblocking filter to the in-block boundary is enabled. Next, deblocking filter unit 109 makes a determination as to the left block boundary (Step S13), makes a determination as to the upper block boundary (Step S14), and ends the determination processing.

When it is determined that the deblocking filter is not to be applied in Step S11 (No in Step S11), deblocking filter unit 109 sets 0 to the in-block control flag (that is, dbf_c_flag) (Step S15). The in-block control flag which has been set to 0 indicates that application of the deblocking filter is disabled. In other words, in Step S15, deblocking filter unit 109 determines that application of the deblocking filter to the in-block boundary is disabled.

Next, deblocking filter unit 109 sets 0 to the left control flag (Step S16). The left control flag is a flag indicating whether application of the deblocking filter to the left block boundary is enabled or disabled. The flag is dbf_a_flag, for example. The left control flag which has been set to 0 indicates that application of the deblocking filter is disabled. In other words, in Step S16, deblocking filter unit 109 determines that application of the deblocking filter to the left boundary is disabled.

Lastly, deblocking filter unit 109 sets 0 to the upper control flag (Step S17). The upper control flag is a flag indicating whether application of the deblocking filter to the upper block boundary is enabled or disabled. The flag is dbf_b_flag, for example. The upper control flag which has been set to 0 indicates that application of the deblocking filter is disabled. In other words, in Step S17, deblocking filter unit 109 determines that application of the deblocking filter to the upper block boundary is disabled. Deblocking filter unit 109 then ends the whole determination processing on the current block.

Figure 11:
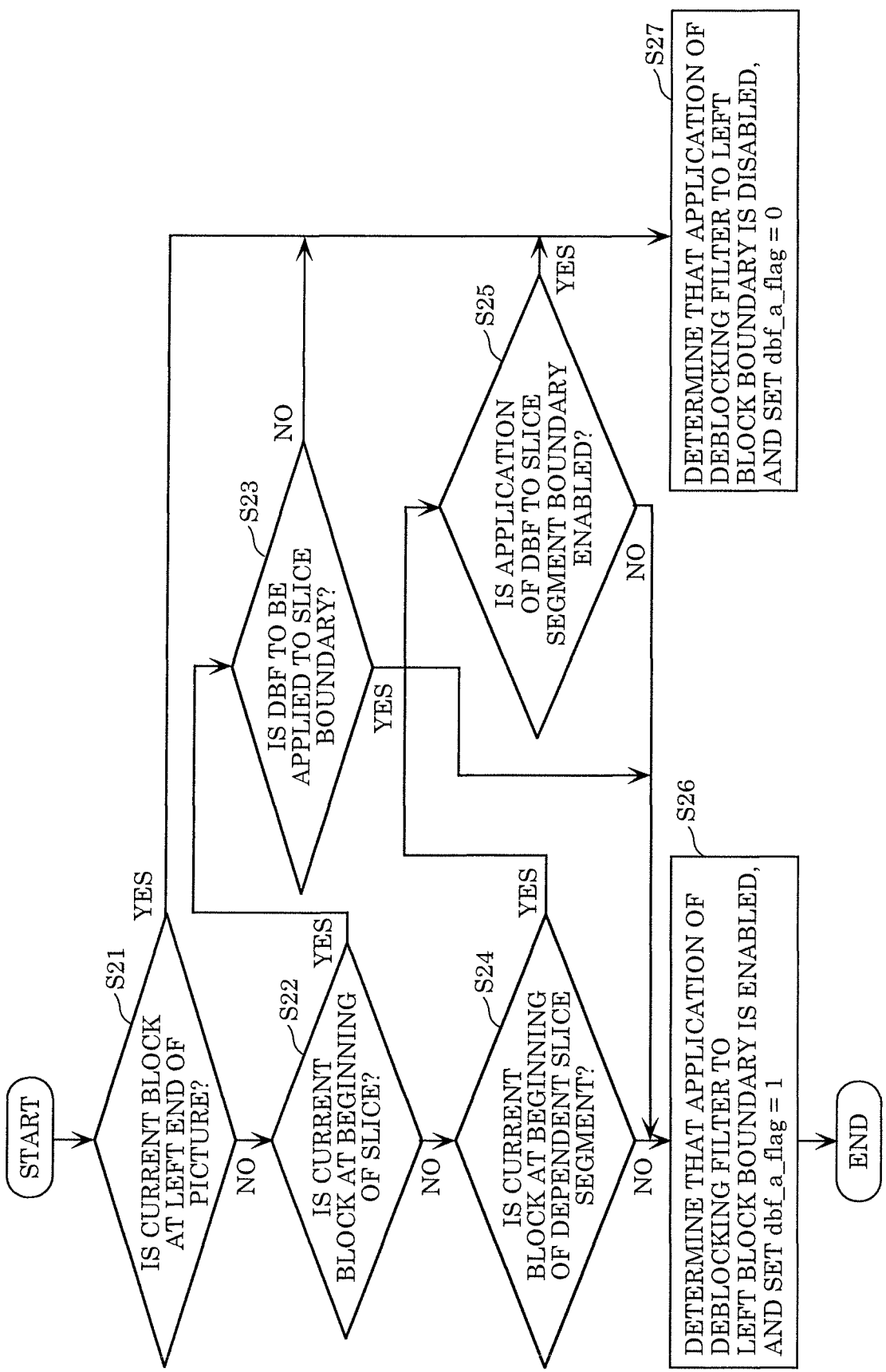
FIG. 11 is a flow chart indicating overall determination processing as to whether to apply a deblocking filter to a left block boundary according to Embodiment 1.

FIG. 11 is a flow chart indicating a determination flow of determining whether deblocking filter unit 109 applies the deblocking filter to the left block boundary of the current block. In other words, FIG. 11 is a flow chart indicating a detailed determination flow in Step S13 in FIG. 10.

First, deblocking filter unit 109 determines whether the current block is located at the left end of the picture (Step S21).

When determining that the current block is located at the left end of the picture (Yes in Step S21), deblocking filter unit 109 sets 0 to the left control flag (that is, dbf_a_flag) (Step S27). The left control flag which has been set to 0 indicates that application of the deblocking filter to the left block boundary is disabled. In other words, in Step S27, deblocking filter unit 109 determines that application of the deblocking filter to the left boundary is disabled. As a result, the determination processing as to the left block boundary ends.

When determining that the current block is not located at the left end of the picture in Step S21 (No in Step S21), deblocking filter unit 109 further determines whether the current block is located at the beginning of the slice (Step S22).

When determining that the current block is located at the beginning of the picture in Step S22 (Yes in Step S22), deblocking filter unit 109 further determines whether to apply the deblocking filter to the slice boundary (Step S23). It is to be noted that the deblocking filter is also referred to as a DBF. More specifically, deblocking filter unit 109 makes the determinations by referring to the first slice-control flag and the second slice-control flag. The first slice-control flag is pps_loop_filter_across_slices_enabled_flag included in the syntax of the picture parameter set indicated in FIG. 7. The second slice-control flag is slice_loop_filter_across_slices_enabled_flag included in the syntax in the slice segment header indicated in FIG. 8. When each of the first slice-control flag and the second slice-control flag indicates 1, deblocking filter unit 109 determines to apply the deblocking filter to the slice boundary. In contrast, when each of the first slice-control flag and the second slice-control flag indicates 0, deblocking filter unit 109 determines not to apply the deblocking filter to the slice boundary.

When it is determined that the deblocking filter is applied to the slice boundary in Step S23 (Yes in Step S23), 1 has been set to the left control flag (that is, dbf_a_flag) described above (Step S26). The left control flag which has been set to 1 indicates that application of the deblocking filter to the left block boundary is enabled. In other words, in Step S26, deblocking filter unit 109 determines that application of the deblocking filter to the left boundary is enabled. As a result, the determination processing as to the left block boundary ends.

When it is determined that the deblocking filter is not to be applied to the slice boundary in Step S23 (No in Step S23), 0 is set to the left control flag (that is, dbf_a_flag) described above (Step S27). As a result, the determination processing as to the left block boundary ends.

When determining that the current block is not located at the beginning of the slice in Step S22 (No in Step S22), deblocking filter unit 109 further determines whether the current block is located at the beginning of a dependent slice segment (Step S24).

When determining that the current block is located at the beginning of the dependent slice segment in Step S24 (Yes in Step S24), deblocking filter unit 109 further determines whether application of the deblocking filter to the slice segment boundary is disabled (Step S25). More specifically, deblocking filter unit 109 makes the determinations by referring to the first segment-control flag and the second segment-control flag. The first segment-control flag is pps_loop_filter_across_slice_segments_disabled_flag included in the syntax of the picture parameter set indicated in FIG. 7. The second segment-control flag is slice_segment_loop_filter_across_slice_segments_disabled_flag included in the syntax of the slice segment header indicated in FIG. 8.

When determining that application of the deblocking filter to the slice segment boundary is disabled in Step S25 (Yes in Step S25), 0 is set to the left control flag (that is, dbf_a_flag) described above (Step S27). In other words, in Step S27, deblocking filter unit 109 determines that application of the deblocking filter to the left boundary is disabled. As a result, the determination processing as to the left block boundary ends.

When determining that application of the deblocking filter to the slice segment boundary is enabled in Step S25 (No in Step S25), 1 is set to the left control flag (that is, dbf_a_flag) described above (Step S26). In other words, in Step S26, deblocking filter unit 109 determines that application of the deblocking filter to the left boundary is enabled. As a result, the determination processing as to the left block boundary ends.

FIG. 12 is a flow chart indicating a determination flow of deblocking filter unit 109 determining whether to apply the deblocking filter to the upper block boundary of the current block. In other words, FIG. 12 is a flow chart indicating a detailed determination flow in Step S14 in FIG. 10.

First, deblocking filter unit 109 determines whether the current block is located at the upper end of the picture (Step S31).

When determining that the current block is located at the upper end of the picture (Yes in Step S31), deblocking filter unit 109 sets 0 to the upper control flag (that is, dbf_b_flag) (Step S37). The upper control flag which has been set to 0 indicates that application of the deblocking filter to the upper block boundary is disabled. In other words, in Step S37, deblocking filter unit 109 determines that application of the deblocking filter to the upper block boundary is disabled. As a result, the determination processing as to the upper block boundary ends.

When determining that the current block is not located at the upper end of the picture in Step S31 (No in Step S31), deblocking filter unit 109 further determines whether the upper boundary of the current block is located at a slice boundary (Step S32). It is to be noted that the upper boundary is the upper block boundary described above.

When determining that the upper boundary of the current block is located at a slice boundary in Step S32 (Yes in Step S32), deblocking filter unit 109 further determines whether to apply the deblocking filter to the slice boundary (Step S33). More specifically, deblocking filter unit 109 makes the determinations by referring to the first slice-control flag and the second slice-control flag. The first slice-control flag is pps_loop_filter_across_slices_enabled_flag included in the syntax of the picture parameter set indicated in FIG. 7. The second slice-control flag is slice_loop_filter_across_slices_enabled_flag included in the syntax in the slice segment header indicated in FIG. 8. When each of the first slice-control flag and the second slice-control flag indicates 1, deblocking filter unit 109 determines to apply the deblocking filter to the slice boundary. In contrast, when each of the first slice-control flag and the second slice-control flag indicates 0, deblocking filter unit 109 determines not to apply the deblocking filter to the slice boundary.

When it is determined that the deblocking filter is applied to the slice boundary in Step S33 (Yes in Step S33), 1 is set to the upper control flag (that is, dbf_b_flag) described above (Step S36). The upper control flag which has been set to 1 indicates that application of the deblocking filter to the upper block boundary is enabled. In other words, in Step S36, deblocking filter unit 109 determines that application of the deblocking filter to the upper block boundary is enabled. As a result, the determination processing as to the upper block boundary ends.

When it is determined that the deblocking filter is not to be applied to the slice boundary in Step S33 (No in Step S33), 0 is set to the upper control flag (that is, dbf_b_flag) described above (Step S37). As a result, the determination processing as to the upper block boundary ends.

When determining that the upper boundary of the current block is not located at a slice boundary in Step S32 (No in Step S32), deblocking filter unit 109 further determines whether the upper boundary of the current block is located at a dependent slice segment boundary (Step S34).

When determining that the upper boundary of the current block is located at a slice boundary in Step S34 (Yes in Step S34), deblocking filter unit 109 further determines whether application of the deblocking filter to the slice segment boundary is disabled (Step S35). More specifically, deblocking filter unit 109 makes the determinations by referring to the first segment-control flag and the second segment-control flag. The first segment-control flag is pps_loop_filter_across_slice_segments_disabled_flag included in the syntax of the picture parameter set indicated in FIG. 7. The second segment-control flag is slice_segment_loop_filter_across_slice_segments_disabled_flag included in the syntax of the slice segment header indicated in FIG. 8.

When determining that application of the deblocking filter to the slice segment boundary is disabled in Step S35 (Yes in Step S35), 0 is set to the upper control flag (that is, dbf_b_flag) described above (Step S37). In other words, in Step S37, deblocking filter unit 109 determines that application of the deblocking filter to the upper block boundary is disabled. As a result, the determination processing as to the upper block boundary ends.

When determining that application of the deblocking filter to the slice segment boundary is enabled in Step S35 (No in Step S35), 1 has been set to the upper control flag (that is, dbf_b_flag) described above (Step S36). In other words, in Step S36, deblocking filter unit 109 determines that application of the deblocking filter to the upper block boundary is enabled. As a result, the determination processing as to the upper block boundary ends.

According to the determination flows indicated in FIGS. 10, 11, and 12, it is possible to calculate the control flags dbf_a_flag, dbf_b_flag, and dbf_c_flag for controlling the deblocking filter to the in-block boundary and each block boundary in the current block. Deblocking filter unit 109 applies the deblocking filter to the in-block boundary and each block boundary, according to the control flags by referring to the control flags. In other words, deblocking filter unit 109 applies, to each of the plurality of slice segments, the filter to the block which has been reconstructed in the slice segment, according to the control information of the slice segment. As a result, it is possible to control application of the deblocking filter to each of the slice segment boundaries.

In this way, it is possible to disable application of the deblocking filter also to the boundary of the slice segment. Thus, it is possible to reduce the influence of errors due to the deblocking filter that supports the refresh method in which dependent slice segments are used.

It is to be noted that encoder 100 in this embodiment is configured as illustrated in FIG. 3, and operates according to the determination flows indicated in FIGS. 10, 11, and 12. However, the configuration of and operations by encoder 100 in this embodiment may be represented as the configuration illustrated in FIG. 13A and the operations indicated in FIG. 13B as more functional or conceptual configuration and operations.

Figure 13A:
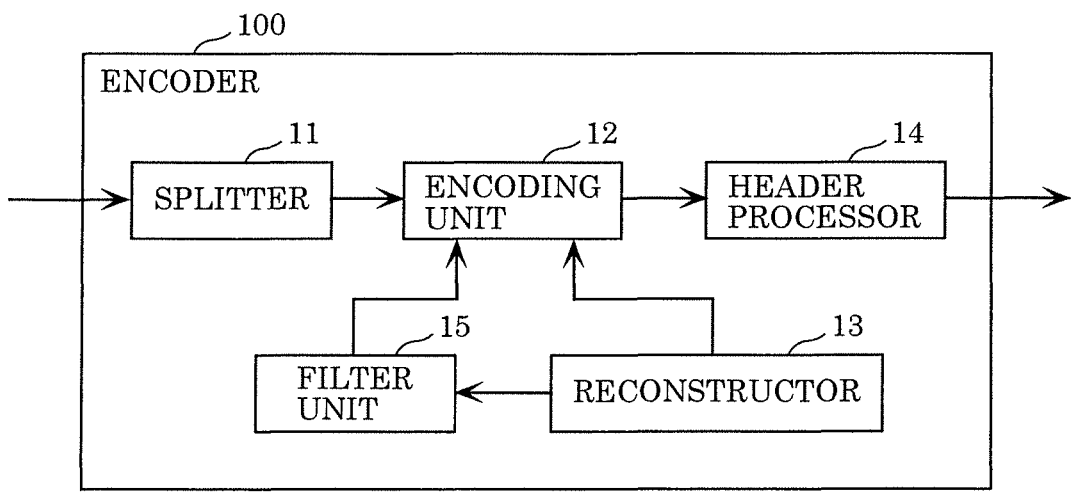
FIG. 13A is a block diagram illustrating a functional configuration of the encoder according to Embodiment 1.

FIG. 13A is a block diagram illustrating a functional configuration of encoder 100 according to this embodiment.

Encoder 100 includes splitter 11, encoding unit 12, reconstructor 13, header processor 14, and filter unit 15.

Splitter 11 splits a picture into a plurality of slice segments. Splitter 11 corresponds to slice splitter 101 illustrated in FIG. 3.

Encoding unit 12 encodes a plurality of blocks included in each of the plurality of slice segments. Encoding unit 12 corresponds to all or part of subtractor 102, orthogonal transformer 103, quantizer 104, encoding processor 119 of entropy encoding unit 105, intra predictor 111, inter predictor 112, motion estimator 113, and determiner 114, as illustrated in FIGS. 3 and 5.

Reconstructor 13 reconstructs a plurality of encoded blocks. Reconstructor 13 corresponds to all or part of inverse quantizer 106, inverse orthogonal transformer 107, and adder 108, illustrated in FIG. 3.

Header processor 14 adds, to each of the plurality of slice segments, control information for controlling application of the filter to the slice segment to the header area of the slice segment. Header processor 14 corresponds to slice header generator 118 in entropy encoding unit 105 illustrated in FIG. 5. The control information is, for example, second segment-control flag described above. The control information is specifically, slice_segment_loop_filter_across_slice_segment_disabled_flag.

Filter unit 15 applies, to each of the plurality of slice segments, a filter on the block which has been reconstructed in the slice segment, according to the control information of the slice segment. Filter unit 15 corresponds to deblocking filter unit 109 illustrated in FIG. 3.

In addition, the configuration illustrated in FIGS. 3, 4, 5, and 13A may be implemented with processing circuitry such as a Central Processing Unit (CPU) or a processor and memory. The memory may store a program for causing the processing circuitry to execute the processing by each of the constituent elements illustrated in the drawings. In addition, the memory may store an image similarly to memory 110 illustrated in FIG. 3.

Figure 13B:
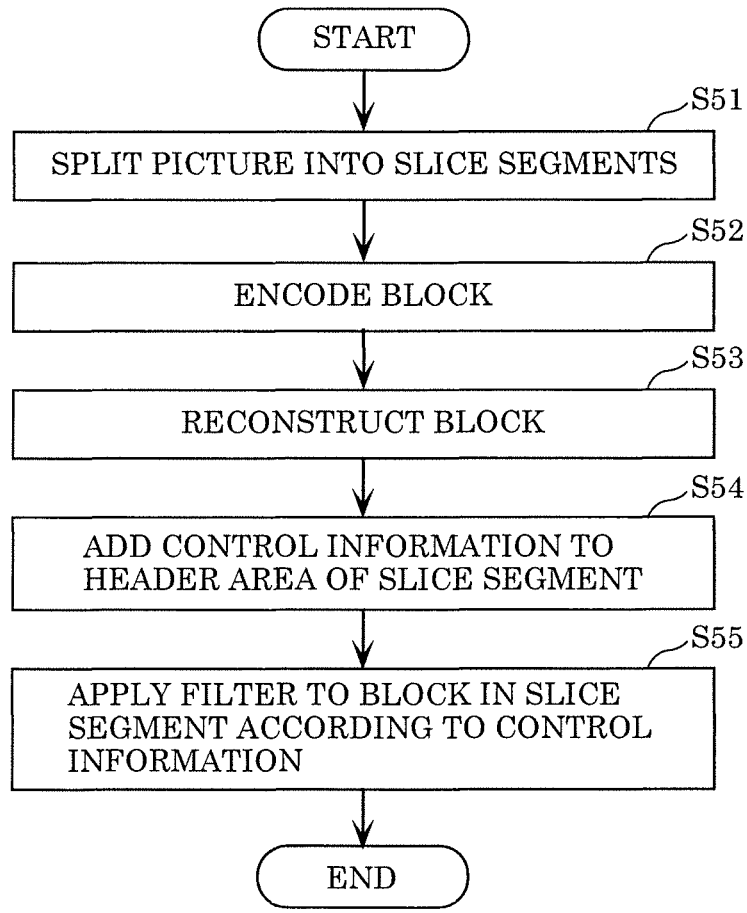
FIG. 13B is a flow chart indicating an encoding method according to Embodiment 1.

FIG. 13B is a flow chart indicating an encoding method according to this embodiment.

Encoder 100 first splits a picture into a plurality of slice segments (Step S51). Next, encoder 100 encodes a plurality of blocks included in each of the plurality of slice segments (Step S52). Next, encoder 100 reconstructs the plurality of blocks encoded (Step S53). Next, encoder 100 adds, for each of the plurality of slice segments, control information to a header area of the slice segment; the control information is for controlling application of a filter to the slice segment (Step S54). Next, encoder 100 applies, for each of the plurality of slice segments, the filter to a block which has been reconstructed in the slice segment, according to the control information for the slice segment (Step S55).

It is to be noted that the processes in Steps S51, S52, S53, S54, and S55 may be performed by splitter 11, encoding unit 12, reconstructor 13, header processor 14, and filter unit 15 illustrated in FIG. 13A, respectively. Alternatively, when encoder 100 includes processing circuitry and memory, the processing circuitry may execute the processing indicated by the flow chart in FIG. 13B by using the memory.

In this way, it is possible to control application of the filter to each of the slice segments such as the independent slice segment and the dependent slice segments. Accordingly, it is possible to control application of the filter in a unit smaller than the unit in the case of controlling application of the filter to each of the slices including a plurality of slice segments. For example, it is possible to disable application of a filter only to intra slice segment boundaries in a slice and enable application of a filter to the other slice segment boundaries in the slice. As a result, even in the case of using the method of refreshing at intra slice segments, it is possible to appropriately reduce error propagation while reducing decrease in image quality. In addition, it is possible to copy and use the header of the independent slice segment for the dependent slice segments among the plurality of slice segments, and thus it is possible to reduce decrease in coding efficiency even when the number of slice segments included in the picture is large. Accordingly, it is possible to reduce error propagation without decreasing the encoding efficiency and the image quality.

In addition, the control information according to this embodiment indicates whether to apply a deblocking filter to the slice segment boundary corresponding to the control information. It is to be noted that the control information is, for example, second segment-control flag described above. The control information is specifically, slice_segment_loop_filter_across_slice_segments_disabled_flag. With this, it is possible to reduce distortion in an image in the slice segment boundary when the deblocking filter is applied.

In addition, the picture split into a plurality of slice segments in this embodiment is one of the plurality of pictures included in a video. Each of the plurality of pictures may include an I-slice segment, and the position of the I-slice segment in the picture changes cyclically across the plurality of pictures, in encoding order of the plurality of pictures. In other words, the plurality of pictures may be configured according to the method of refreshing at intra slice segments, that is, Cyclic Intra Refresh (CIR). In such a case, in this embodiment, control information indicating that no filter is applied to the boundary between the slice segment corresponding to the control information and the I-slice segment may be applied to the header area of the slice segment. In this way, it is possible to appropriately reduce error propagation even when the method of refreshing at intra slice segments, that is, CIR is used.

Embodiment 2

Figure 14:
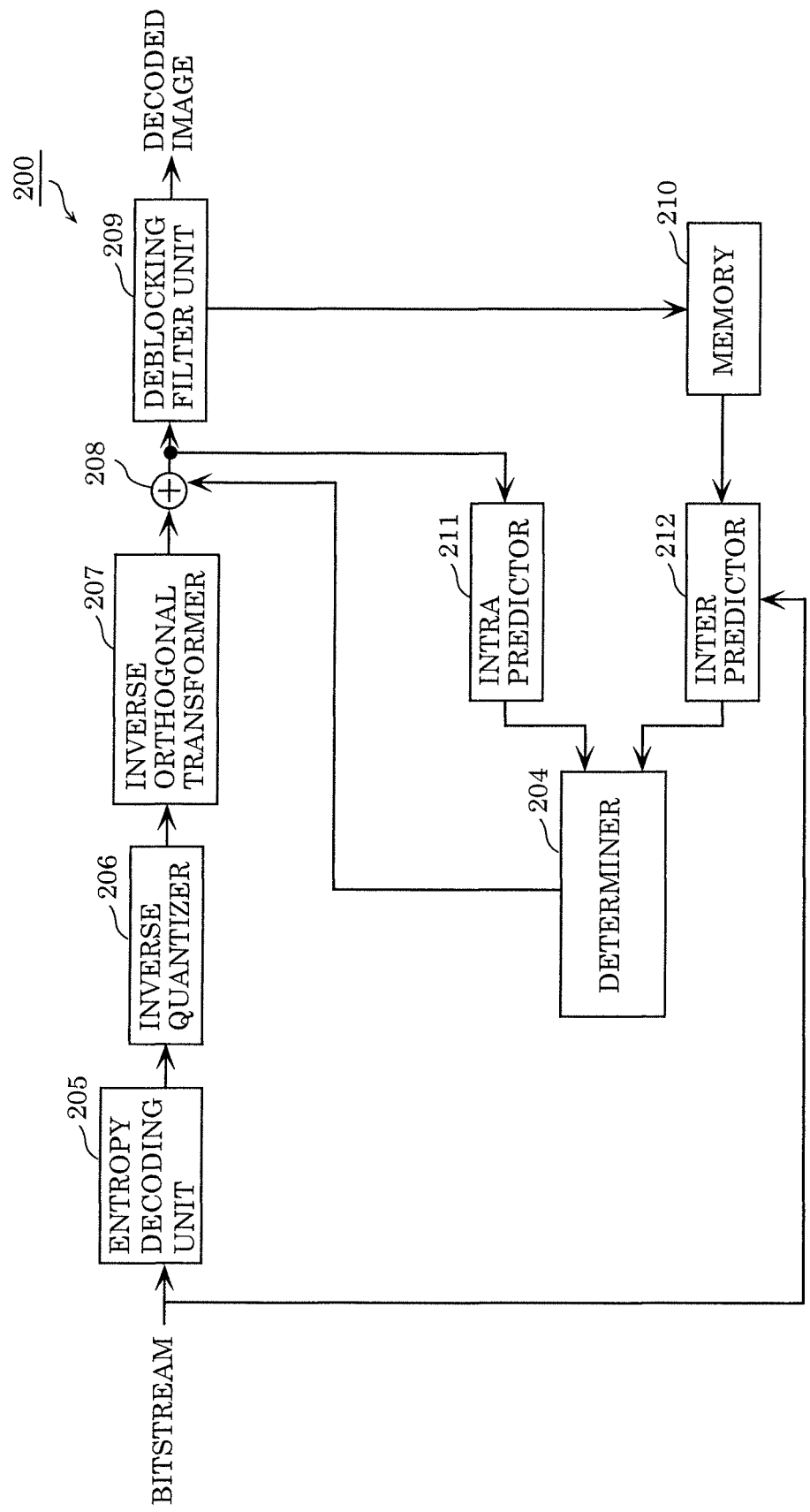
FIG. 14 is a block diagram illustrating a decoder according to Embodiment 2.

FIG. 14 is a block diagram illustrating a configuration of a decoder according to this embodiment.

Decoder 200 according to this embodiment is an apparatus capable of appropriately reducing error propagation. Decoder 200 includes entropy decoding unit 205, inverse quantizer 206, inverse orthogonal transformer 207, adder 208, deblocking filter unit 209, memory 210, intra predictor 211, inter predictor 212, and determiner 214.

Entropy decoding unit 205 performs entropy decoding (variable length decoding) on a bitstream to generate a quantized coefficient sequence and a motion vector.

Inverse quantizer 206 performs inverse quantization on the coefficient sequence quantized. Inverse orthogonal transformer 207 performs inverse orthogonal transform (inverse frequency transform) such as inverse discrete cosine transform on the plurality of frequency coefficients included in the coefficient sequence inverse quantized to generate a decoded differential image.

Adder 208 obtains a prediction image from determiner 214, adds the prediction image and the decoded differential image generated by inverse orthogonal transformer 207 to generate a decoded image (reconstructed image).

Deblocking filter unit 209 removes a block distortion of the decoded image generated by adder 208 and outputs the decoded image. In addition, deblocking filter unit 209 stores, to memory 210, the decoded image from which the block distortion has been removed.

Memory 210 is a memory for storing a decoded image as a reference image at the time of inter prediction. It is to be noted that memory 210 is used as a decoded picture buffer (DPB).

Intra predictor 211 performs intra prediction on the current block using the decoded image generated by adder 208 to generate a prediction image (intra prediction image). It is to be noted that a current block in this embodiment is a block which is a decoding target among picture included in a bitstream.

Inter predictor 212 refers to an image stored in memory 210 as a reference image, and performs motion compensation on the current block using the motion vector generated by entropy decoding unit 205. Inter predictor 212 performs such motion compensation, that is, inter prediction for the current block to generate a prediction image (inter prediction image) of the current block.

Determiner 214 determines whether to perform intra prediction encoding or inter prediction encoding on the current block. Here, when intra prediction encoding is performed on the current block, determiner 214 outputs the prediction image (intra prediction image) generated by intra predictor 211 to adder 208. When inter prediction encoding is performed on the current block, determiner 214 outputs the prediction image (intra prediction image) generated by inter predictor 212 to adder 208. Here, determiner 214 has the same configuration as that of determiner 114 according to Embodiment 1.

Figure 15:
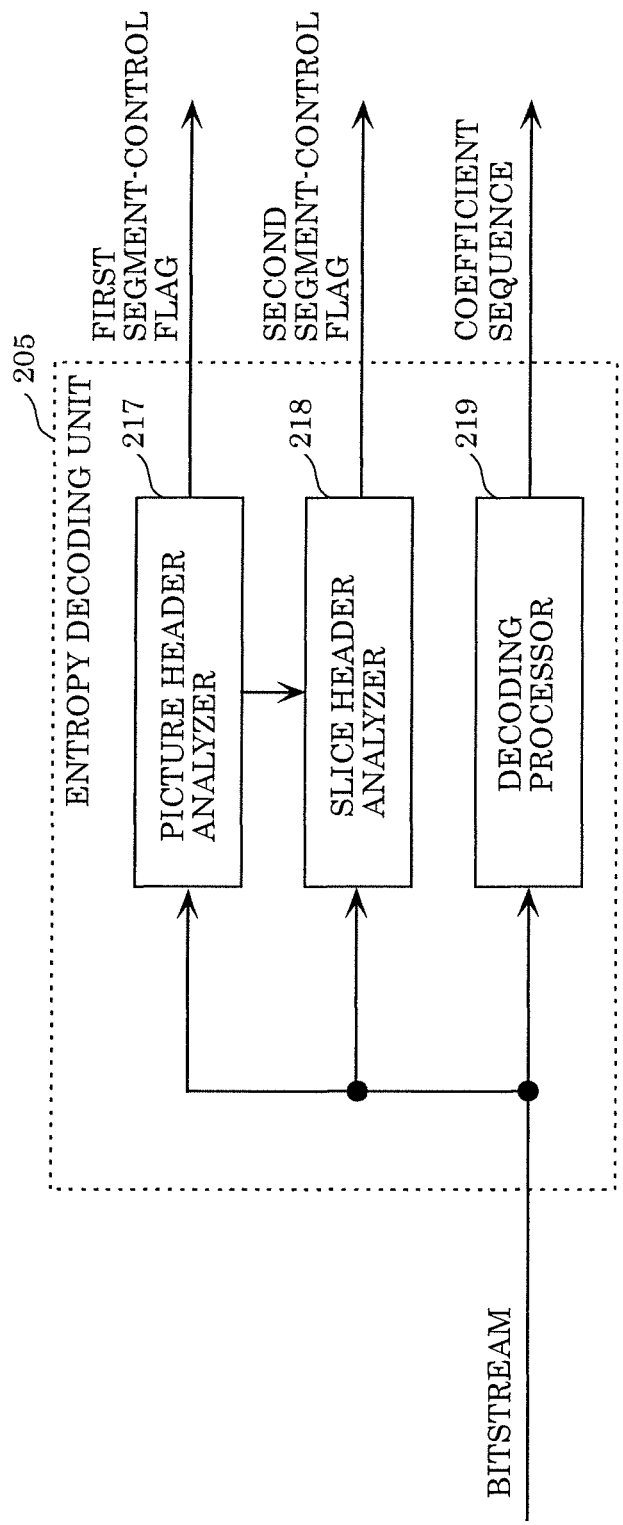
FIG. 15 is a block diagram illustrating an entropy decoding unit according to Embodiment 2.

FIG. 15 is a block diagram illustrating a configuration of entropy decoding unit 205.

Entropy decoding unit 205 includes picture header analyzer 217, slice header analyzer 218, and decoding processor 219.

Picture header analyzer 217 analyzes a picture parameter set, thereby extracting each of flags from the picture parameter set. The flags are a first slice-control flag, a first segment-control flag, a first DBF-control flag, etc.

Slice header analyzer 218 analyzes a slice header or a slice segment header, thereby extracting each of flags from the header. The flags are a second slice-control flag, a second segment-control flag, a second DBF-control flag, etc.

For example, slice header analyzer 218 obtains the first segment-control flag from picture header analyzer 217, and determines whether the first segment-control flag has been set to 1. It is to be noted that the first segment-control flag which has been set to 1 indicates that the second segment-control flag is included in the slice segment header. In view of this, when determining that the first segment-control flag has been set to 1, slice header analyzer 218 analyzes the slice segment header, thereby extracting the second segment-control flag from the slice segment header.

Each of the flags extracted by picture header analyzer 217 and slice header analyzer 218 is used by deblocking filter unit 209.

Decoding processor 219 performs entropy decoding on the bitstream, and outputs the quantized coefficient sequence.

Deblocking filter unit 209 according to this embodiment executes processing similar to the processing performed by deblocking filter unit 109 according to Embodiment 1. Specifically, deblocking filter unit 209 operates based on the syntaxes indicated in FIGS. 7 and 8. Furthermore, deblocking filter unit 209 determines whether to apply the deblocking filter to a target block according to the flow charts indicated in FIGS. 10, 11, and 12.

Accordingly, also in this embodiment, it is possible to calculate control flags for controlling a deblocking filter to an in-block boundary and each of block boundaries of the current block according to the determination flows indicated in FIGS. 10, 11, and 12, as in Embodiment 1. It is to be noted that the control flags are dbf_a_flag, dbf_b_flag, and dbf_c_flag. Deblocking filter unit 209 applies the deblocking filter to the in-block boundary and each block boundary, according to the control flags by referring to the control flags. In other words, deblocking filter unit 209 applies, to each of the plurality of slice segments, the filter to the block which has been reconstructed in the slice segment, according to the control information of the slice segment. As a result, it is possible to control application of the deblocking filter to each of the slice segment boundaries.

In this way, it is possible to disable application of the deblocking filter also to the slice segment. Thus, it is possible to reduce the influence of errors due to the deblocking filter that supports the refresh method in which dependent slice segments are used.

It is to be noted that decoder 200 in this embodiment is configured as illustrated in FIG. 14, and operates according to the determination flows indicated in FIGS. 10, 11, and 12. However, the configuration of and operations by decoder 200 in this embodiment may be represented as the configuration illustrated in FIG. 16A and the operations indicated in FIG. 16B as more functional or conceptual configuration and operations.

Figure 16A:
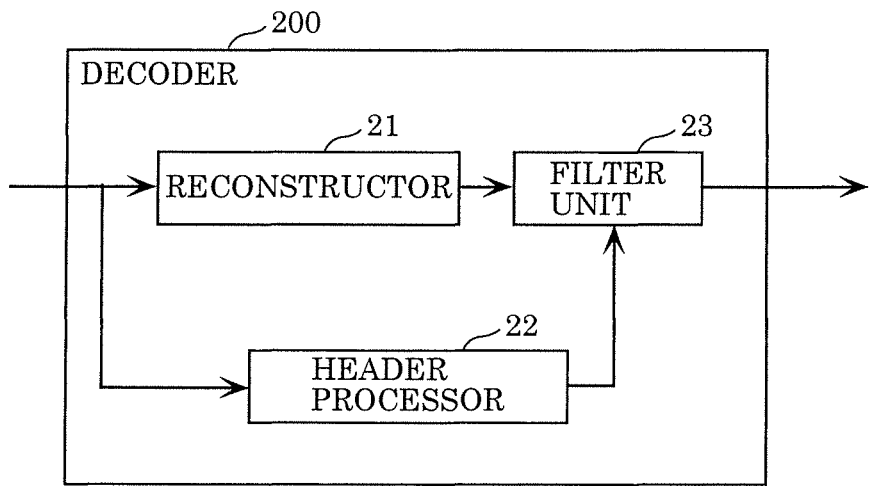
FIG. 16A is a block diagram illustrating a functional configuration of the decoder according to Embodiment 2.

FIG. 16A is a block diagram illustrating a functional configuration of decoder 200 according to this embodiment.

Decoder 200 includes reconstructor 21, header processor 22, and filter unit 15.

Reconstructor 21 reconstructs a plurality of blocks included in each of a plurality of slice segments included in an encoded picture. Reconstructor 21 corresponds to all or part of decoding processor 219 in entropy decoding unit 205, inverse quantizer 206, inverse orthogonal transformer 207, adder 208, intra predictor 211, inter predictor 212, and determiner 214.

Header processor 22 adds, to each of the plurality of slice segments, control information for controlling application of the filter to the slice segment from the header area of the slice segment. Header processor 22 corresponds to slice header analyzer 218 in entropy decoding unit 205 illustrated in FIG. 15. It is to be noted that the control information is, for example, second segment-control flag described above. The control information is specifically, slice_segment_loop_filter_across_slice_segments_disabled_flag.

Filter unit 23 applies, to each of the plurality of slice segments, a filter on the block which has been reconstructed in the slice segment, according to the control information of the slice segment. Filter unit 23 corresponds to deblocking filter unit 209 illustrated in FIG. 14.

In addition, the configuration illustrated in FIGS. 14, 15, and 16A may be implemented with processing circuitry such as a Central Processing Unit (CPU) or a processor and memory. The memory may store a program for causing the processing circuitry to execute the processing by each of the constituent elements illustrated in the drawings. In addition, the memory may store an image similarly to memory 210 illustrated in FIG. 14.

Figure 16B:
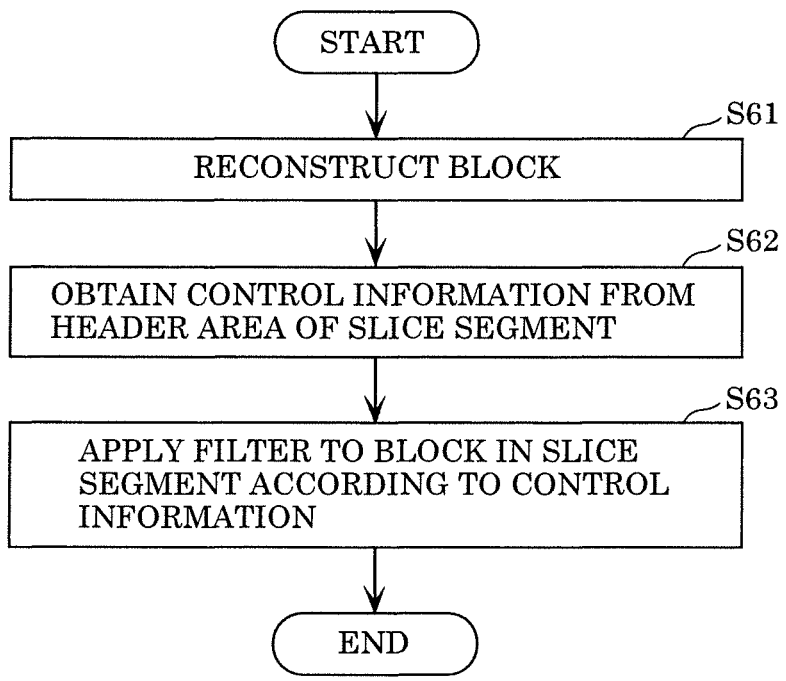
FIG. 16B is a flow chart indicating a decoding method according to Embodiment 2.

FIG. 16B is a flow chart indicating a decoding method according to this embodiment.

Decoder 200 first reconstructs a plurality of blocks included in each of a plurality of slice segments included in the encoded picture (Step S61). Next, decoder 200 obtains, for each of the plurality of slice segments, control information from a header area of the slice segment; the control information is for controlling application of a filter to the slice segment (Step S62). Next, decoder 200 applies, for each of the plurality of slice segments, the filter to the plurality of blocks which have been reconstructed in the slice segment, according to the control information for the slice segment (Step S63).

It is to be noted that the processes in Steps S61, S62, and S63 may be performed by reconstructor 21, header processor 22, and filter unit 23 illustrated in FIG. 16A, respectively. Alternatively, when decoder 200 includes processing circuitry and memory, the processing circuitry may execute the processing indicated by the flow chart in FIG. 16B by using the memory.

In this way, it is possible to control application of the filter to each of the slice segments such as the independent slice segment and the dependent slice segments. Accordingly, it is possible to control application of the filter in a unit smaller than the unit in the case of controlling application of the filter to each of the slices including a plurality of slice segments. For example, it is possible to disable application of a filter only to intra slice segment boundaries in a slice and enable application of a filter to the other slice segment boundaries in the slice. As a result, even in the case of using the method of refreshing at intra slice segments, it is possible to appropriately reduce error propagation while reducing decrease in image quality. In addition, it is possible to copy and use the header of the independent slice segment for the dependent slice segments among the plurality of slice segments, and thus it is possible to reduce decrease in coding efficiency even when the number of slice segments included in the picture is large. Accordingly, it is possible to reduce error propagation without decreasing the coding efficiency and the image quality.

In addition, the control information according to this embodiment indicates whether to apply a deblocking filter to the slice segment boundary corresponding to the control information. It is to be noted that the control information is, for example, second segment-control flag described above. The control information is specifically, slice_segment_loop_filter_across_slice_segments_disabled_flag. With this, it is possible to reduce distortion in an image in the slice segment boundary when the deblocking filter is applied.

In addition, the picture split into a plurality of slice segments in this embodiment is one of the plurality of pictures included in a video. Each of the plurality of pictures may include an I-slice segment, and the position of the I-slice segment in the picture may change cyclically across the plurality of pictures, in encoding order of the plurality of pictures. In other words, the plurality of pictures may be configured according to the method of refreshing at intra slice segments, that is, Cyclic Intra Refresh (CIR). In such a case, in this embodiment, control information indicating that no filter is applied to the boundary between the slice segment corresponding to the control information and the I-slice segment may be added to the header area of the slice segment. In this way, it is possible to appropriately reduce error propagation even when the method of refreshing at intra slice segments, that is, CIR is used.

Although the encoder and the decoder according to aspects of the present disclosure have been described above based on the respective embodiments, the present disclosure is not limited to the above-described embodiments.

For example, although a picture when split into a plurality of slice segments includes one independent slice segment in the above embodiments, such a picture may include two or more independent slice segments. In this case, each of the two or more independent slice segments include at least one dependent slice segment which depends from the independent slice segment.

In the above embodiments, error propagation due to the influence of the deblocking filter is reduced by controlling application of the deblocking filter to the boundaries between slice segments. However, control targets are not limited to the deblocking filter. For example, it is also excellent to control application of Sample Adaptive Offset (SAO) to the boundaries between slice segments. In addition, control information may indicate whether to apply sample adaptive offset to the boundary between slice segments corresponding to the control information. In this way, when the sample adaptive offset is applied, it is possible to make the decoded image obtained by decoding each encoded block closer to the original image.

In the above embodiments, as indicated in FIG. 8, slice_segment_loop_filter_across_slice_segments_disabled_flag is used as the second segment-control flag. The second segment-control flag is set to 1 when application of the deblocking filter is disabled. However, the second segment-control flag may be set to 1 when application of the deblocking filter is enabled, and may be set to 0 when application of the deblocking filter is disabled. In this way, the value which is one of 1 and 0 to be set to each flag in each of the above embodiments may be changed to the other one of 1 and 0.

In the above embodiments, error propagation due to the influence of the deblocking filter is reduced by controlling application of the deblocking filter to the boundaries between slice segments. However, control targets are not limited to the deblocking filter at the boundaries between the slice segments. For example, it is also excellent to control application of the deblocking filter to all the blocks in a target slice segment. More specifically, it is also excellent to control application of the deblocking filter not only to the boundaries between the slice segments but also to the boundaries between all the blocks in the slice segment. More specifically, control information indicates whether to apply the deblocking filter to the boundary between the slice segments corresponding to the control information and the boundaries between the plurality of blocks in the slice segment. For example, it is possible to prevent the influence of error propagation due to the deblocking filter by not applying the deblocking filter to each of the blocks in the slice segment.

It is to be noted that, in each of the above embodiments, each of the constituent elements may be implemented with a dedicated hardware configuration or implemented by executing a software program suitable for the constituent element. Each constituent element may be implemented by a program executer such as a CPU or a processor reading and executing a software program which is recorded on a recording medium such as a hard disc or a semiconductor memory. Here, the software which implements the encoder, the decoder, or the like according to each embodiment is a program causing a computer to execute the steps in the flow charts indicated in FIGS. 10, 11, 12, 13B, and 16B. The encoder, the decoder, the encoding method, and the decoding method according to the embodiments are also referred to as an image encoder, an image decoder, an image encoding method, and an image decoding method.

The encoder, decoder, etc according to the embodiments may support HEVC or other image coding standards.

Embodiment 3

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

Figure 17:
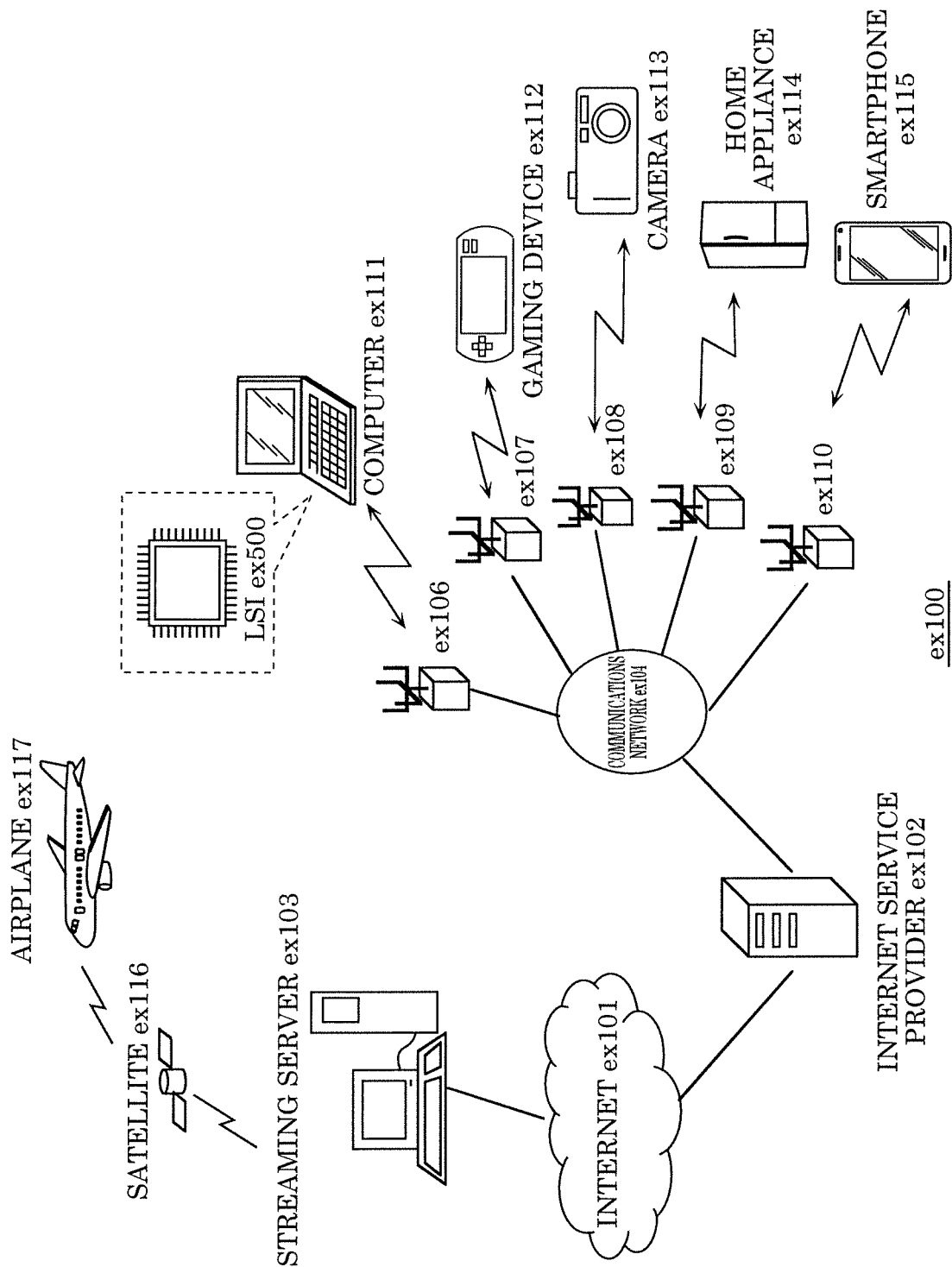
FIG. 17 illustrates an overall configuration of a content providing system for implementing a content distribution service.

FIG. 17 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex114 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 18:
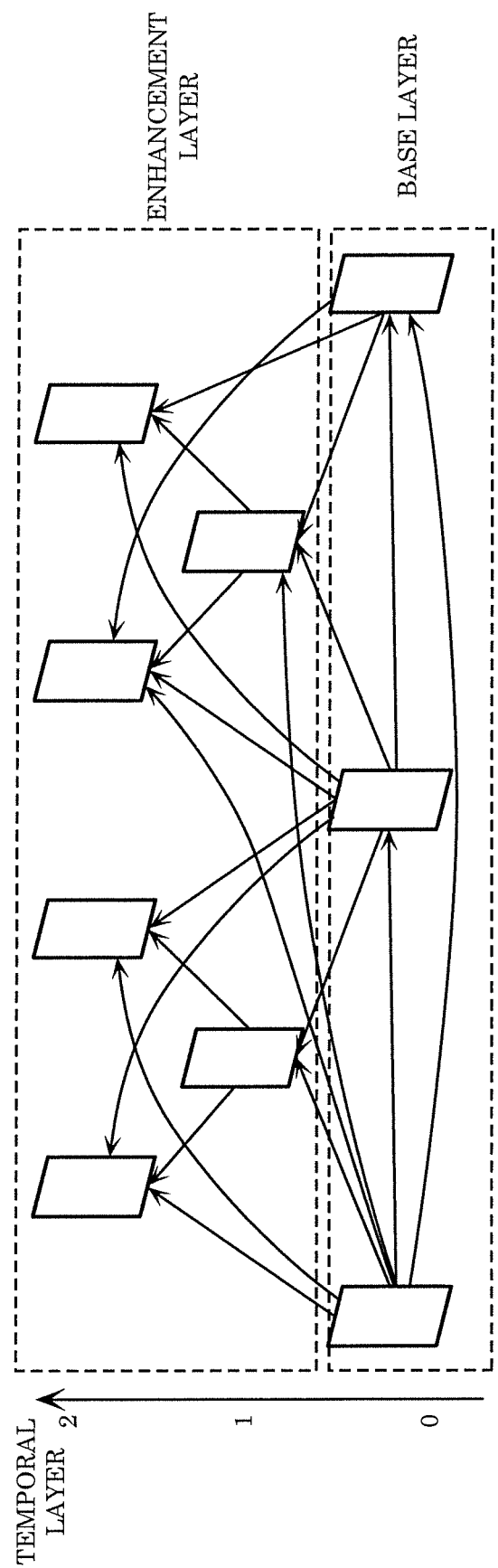
FIG. 18 illustrates one example of an encoding structure in scalable encoding.

The switching of content will be described with reference to a scalable stream, illustrated in FIG. 18, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 18. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 19:
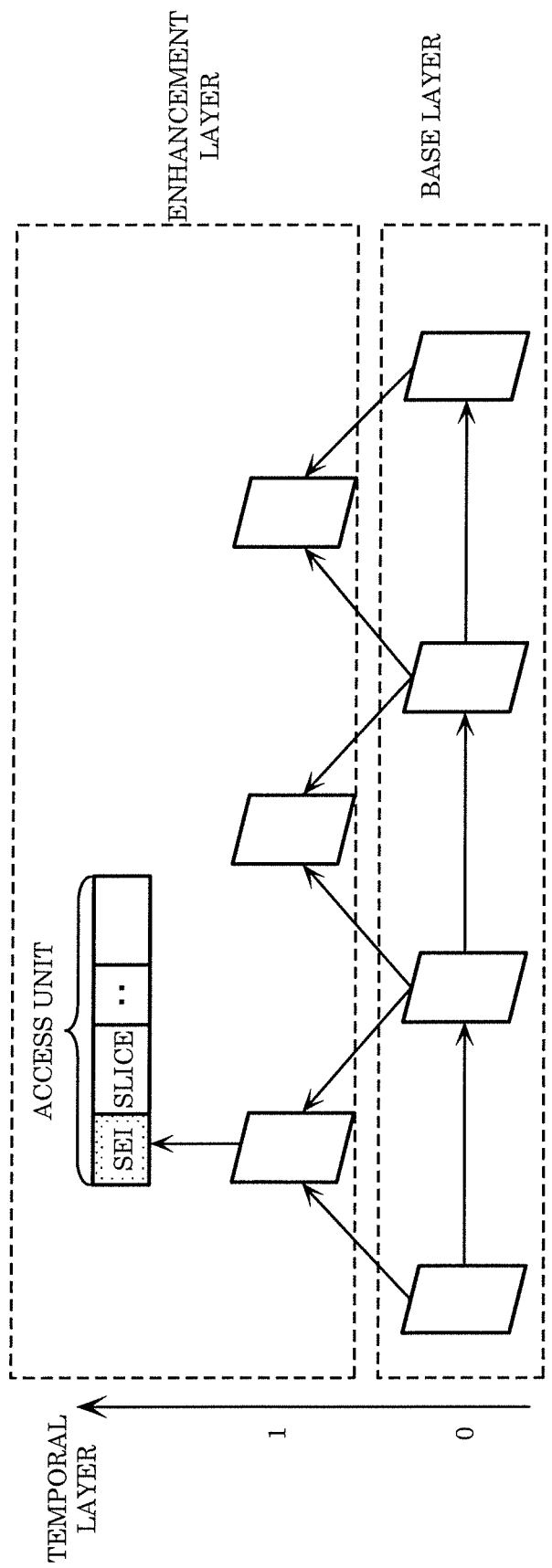
FIG. 19 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 19, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 20:
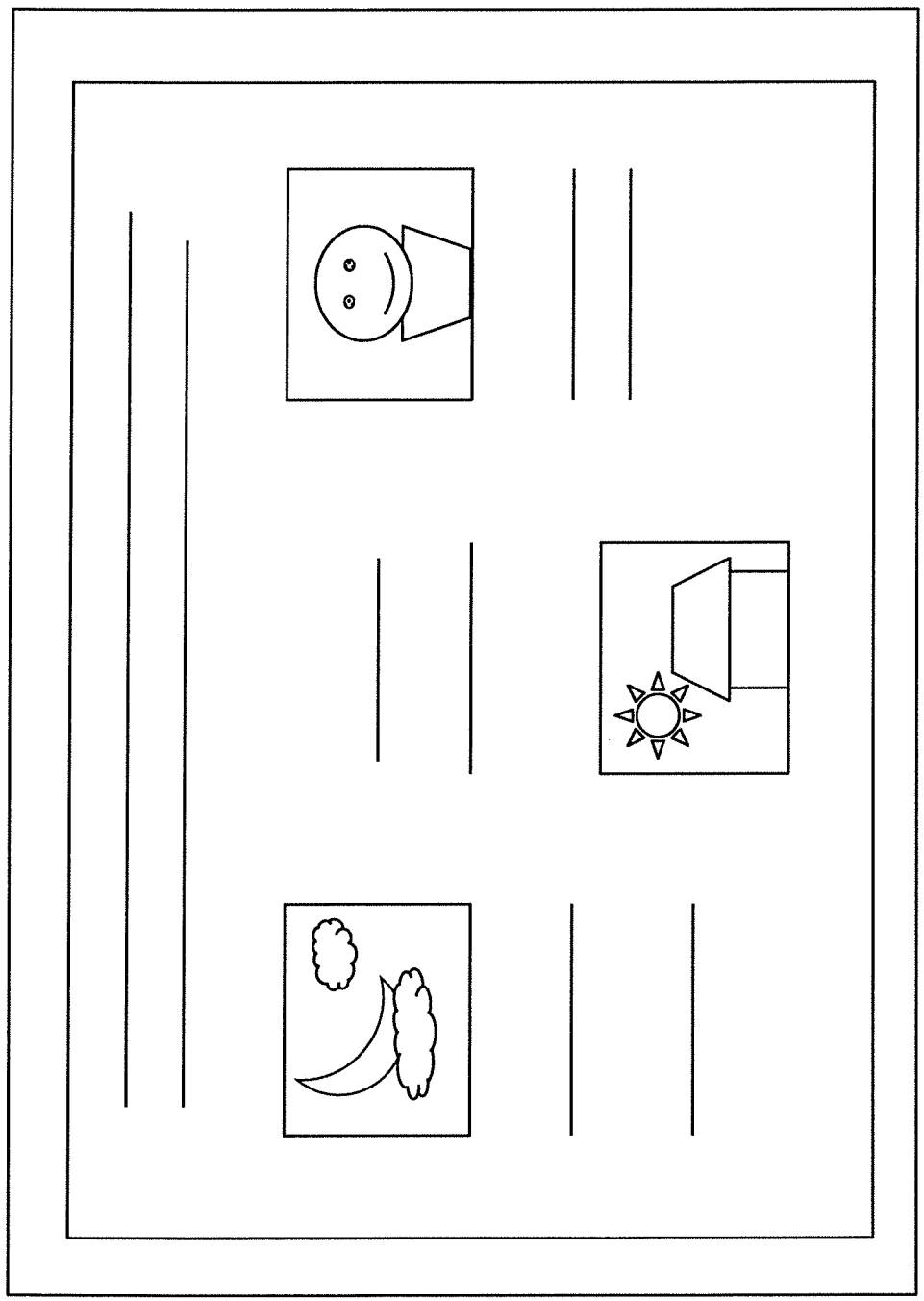
FIG. 20 illustrates an example of a display screen of a web page.
Figure 21:
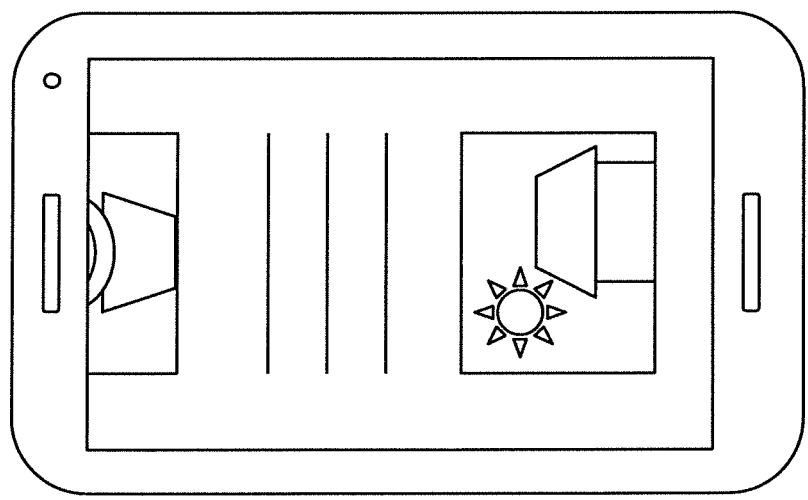
FIG. 21 illustrates an example of a display screen of a web page.

FIG. 20 illustrates an example of a display screen of a web page on, for example, computer ex111. FIG. 21 illustrates an example of a display screen of a web page on, for example, smartphone ex115. As illustrated in FIG. 20 and FIG. 21, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 22:
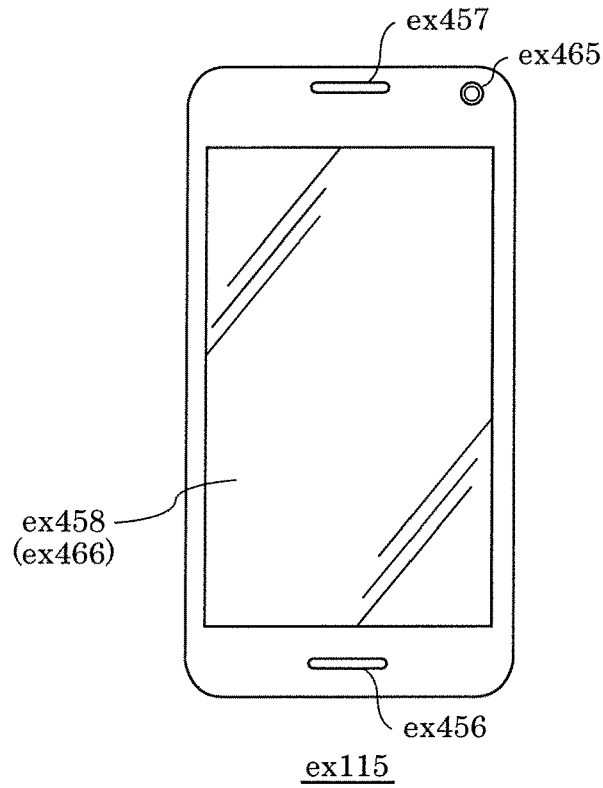
FIG. 22 illustrates one example of a smartphone.
Figure 23:
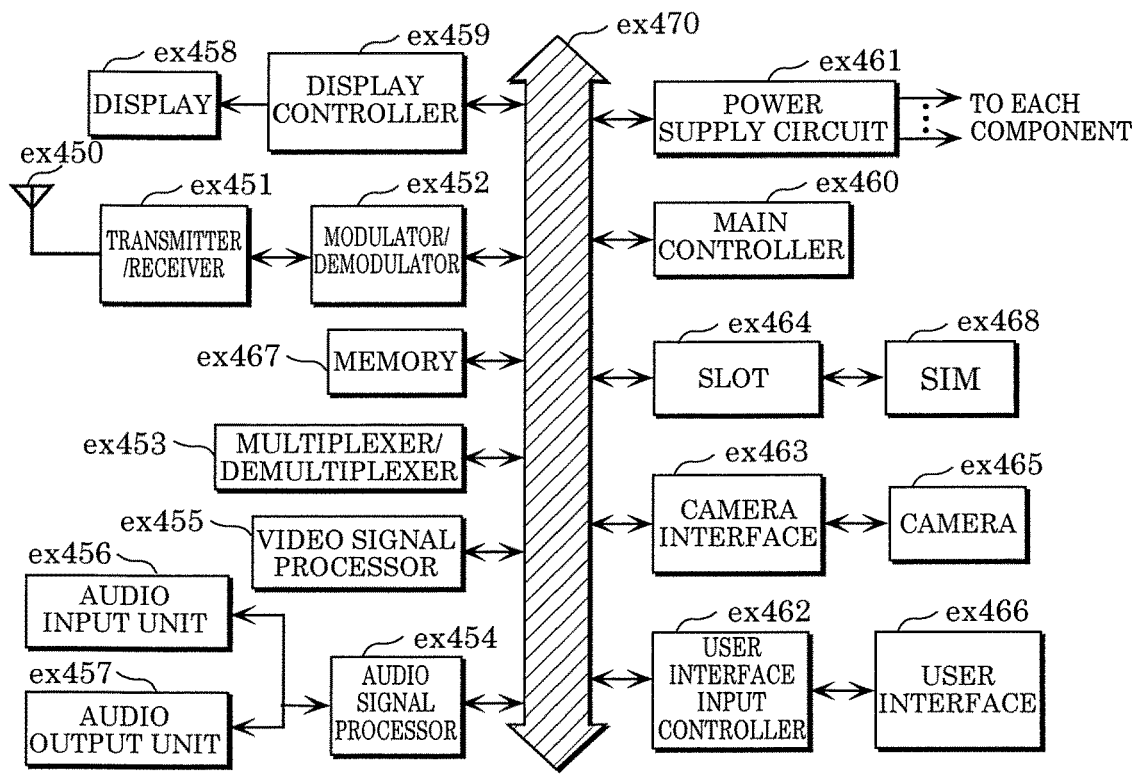
FIG. 23 is a block diagram illustrating a configuration example of a smartphone.

FIG. 22 illustrates smartphone ex115. FIG. 23 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

It is to be noted that the processing performed in units of a slice segment in each embodiment according to the present disclosure may be performed in units different from the units of a slice segment. It is also excellent to perform the processing for each area including at least one block (CU, PU, or TU), for example, in units of a tile. When the processing in the present disclosure is performed in units of a tile, an independent slice segment and a dependent slice segment may correspond to an independent tile and a dependent tile, respectively. An intra slice in CIR may be a tile or a processing unit different from a tile as long as the intra slice is an intra prediction area including at least one block to be intra predicted. At this time, the intra prediction area in CIR may be located at a place in a direction different from the downward vertical direction, with respect to the place of an intra prediction area in a picture which has been encoded immediately before. For example, the intra prediction area may be located rightward compared to the intra prediction area in a picture which has been encoded immediately before.

Although the encoder and the decoder according to the present disclosure have been described above based on each of the embodiments, the present disclosure is not limited to the embodiment. Those skilled in the art will readily appreciate that many modifications are possible in the above-described exemplary embodiments and constituent elements in different embodiments can be optionally combined to configure other embodiments without materially departing from the novel teachings and advantages of the present disclosure. Accordingly, all such modifications and embodiments are intended to be included within the scope of the present disclosure.

INDUSTRIAL APPLICABILITY

The encoder and the decoder according to the present disclosure provide the effect of appropriately reducing error propagation. The encoder and the decoder are applicable to, for example, information display apparatuses or imaging apparatuses such as television sets, digital video recorders, car navigation systems, mobile phones, digital cameras, digital video cameras, on-vehicle cameras, and network cameras. Thus, the encoder and the decoder are highly applicable.

What is claimed is:

1. An encoder which encodes a picture, the encoder comprising:
processing circuitry; and
memory,
wherein, using the memory, the processing circuitry:
splits the picture into a plurality of slices;
splits each of the plurality of slices into a plurality of slice segments including an independent slice segment and a dependent slice segment dependent on the independent slice segment;
encodes a plurality of blocks included in each of the plurality of slice segments;
reconstructs the plurality of blocks encoded;
adds, for each of the plurality of slice segments, control information to a header area of the slice segment, the control information being for controlling application of a filter to the slice segment; and
applies, for each of the plurality of slice segments, the filter to a block which has been reconstructed in the slice segment, according to the control information of the slice segment, and
wherein when a current slice segment to be processed is the dependent slice segment, the processing circuitry adds, as the control information, to the header area of the current slice segment both
  (i) information indicating whether to apply a filter to a slice boundary between (a) a slice including the current slice segment and a neighboring slice segment adjacent to the current slice segment and (b) a neighboring slice adjacent to the slice, and
  (ii) information indicating whether to apply a filter to a slice segment boundary between (a) the current slice segment included in the slice and (b) the neighboring slice segment adjacent to the current slice segment and included in the slice.

2. The encoder according to claim 1,
wherein the control information indicates whether to apply a deblocking filter to a boundary of the slice segment corresponding to the control information.

3. The encoder according to claim 1,
wherein the control information indicates whether to apply a sample adaptive offset to a boundary of the slice segment corresponding to the control information.

4. The encoder according to claim 1,
wherein the control information indicates whether to apply a deblocking filter to each of a boundary of the slice segment corresponding to the control information and a boundary between the plurality of blocks included in the slice segment.

5. The encoder according to claim 1,
wherein the picture is one of a plurality of pictures included in a video,
each of the plurality of pictures includes an I-slice segment, and a position of the I-slice segment in the picture changes cyclically across the plurality of pictures, in encoding order of the plurality of pictures, and
when the control information is added,
the control information which indicates that no filter is to be applied to a boundary between the slice segment corresponding to the control information and the I-slice segment is added to the header area of the slice segment.

6. An encoder which encodes a picture, comprising:
a splitter which splits the picture into a plurality of slices, and splits each of the plurality of slices into a plurality of slice segments including an independent slice segment and a dependent slice segment dependent on the independent slice segment;
an encoding unit which encodes a plurality of blocks included in each of the plurality of slice segments;
a reconstructor which reconstructs the plurality of blocks encoded;
a header processor which adds, for each of the plurality of slice segments, control information to a header area of the slice segment, the control information being for controlling application of a filter to the slice segment; and
a filter unit which applies, for each of the plurality of slice segments, the filter to a block which has been reconstructed in the slice segment, according to the control information of the slice segment,
wherein when a current slice segment to be processed is the dependent slice segment, the header processor adds, as the control information, to the header area of the current slice segment both
  (i) information indicating whether to apply a filter to a slice boundary between (a) a slice including the current slice segment and a neighboring slice segment adjacent to the current slice segment and (b) a neighboring slice adjacent to the slice, and
  (ii) information indicating whether to apply a filter to a slice segment boundary between (a) the current slice segment included in the slice and (b) the neighboring slice segment adjacent to the current slice segment and included in the slice.

7. A decoder which decodes an encoded picture, comprising:
processing circuitry: and
memory,
wherein, using the memory, the processing circuitry:
reconstructs a plurality of blocks included in each of a plurality of slice segments included in the encoded picture, the plurality of slice segments including an independent slice segment and a dependent slice segment dependent on the independent slice segment;
obtains, for each of the plurality of slice segments, control information from a header area of the slice segment, the control information being for controlling application of a filter to the slice segment; and
applies, for each of the plurality of slice segments, the filter to the plurality of blocks which have been reconstructed in the slice segment, according to the control information of the slice segment, and
wherein when a current slice segment to be processed is the dependent slice segment, the processing circuitry obtains, as the control information, from the header area of the current slice segment both
(i) information indicating whether to apply a filter to a slice boundary between (a) a slice including the current slice segment and a neighboring slice segment adjacent to the current slice segment and (b) a neighboring slice adjacent to the slice, and
(ii) information indicating whether to apply a filter to a slice segment boundary between (a) the current slice segment included in the slice and (b) the neighboring slice segment adjacent to the current slice segment and included in the slice.

8. The decoder according to claim 7,
wherein the control information indicates whether to apply a deblocking filter to a boundary of the slice segment corresponding to the control information.

9. The decoder according to claim 7,
wherein the control information indicates whether to apply a sample adaptive offset to a boundary of the slice segment corresponding to the control information.

10. The decoder according to claim 7,
wherein the control information indicates whether to apply a deblocking filter to at least one of a boundary of the slice segment corresponding to the control information and a boundary between the plurality of blocks included in the slice segment.

11. The decoder according to claim 7,
wherein the encoded picture is one of a plurality of encoded pictures included in a bitstream,
each of the plurality of pictures includes an I-slice segment, and a position of the I-slice segment in the picture changes cyclically across the plurality of pictures, in decoding order of the plurality of pictures, and
when the control information is obtained,
the control information which indicates that no filter is to be applied to a boundary between the slice segment corresponding to the control information and the I-slice segment is obtained from the header area of the slice segment.

12. A decoder which decodes an encoded picture, comprising:
a reconstructor which reconstructs a plurality of blocks included in each of a plurality of slice segments included in the encoded picture, the plurality of slice segments including an independent slice segment and a dependent slice segment dependent on the independent slice segment;
a header processor which obtains, for each of the plurality of slice segments, control information from a header area of the slice segment, the control information being for controlling application of a filter to the slice segment; and
a filter unit which applies, for each of the plurality of slice segments, the filter to the plurality of blocks which have been reconstructed in the slice segment, according to the control information of the slice segment,
wherein when a current slice segment to be processed is the dependent slice segment, the header processor obtains, as the control information, from the header area of the current slice segment both
(i) information indicating whether to apply a filter to a slice boundary between (a) a slice including the current slice segment and a neighboring slice segment adjacent to the current slice segment and (b) a neighboring slice adjacent to the slice, and
(ii) information indicating whether to apply a filter to a slice segment boundary between (a) the current slice segment included in the slice and (b) the neighboring slice segment adjacent to the current slice segment and adjacent to the slice.

13. An encoding method of encoding a picture, comprising:
splitting the picture into a plurality of slices;
splits each of the plurality of slices into a plurality of slice segments including an independent slice segment and a dependent slice segment dependent on the independent slice segment;
encoding a plurality of blocks included in each of the plurality of slice segments;
reconstructing the plurality of blocks encoded;
adding, for each of the plurality of slice segments, control information to a header area of the slice segment, the control information being for controlling application of a filter to the slice segment; and
applying, for each of the plurality of slice segments, the filter to a block which has been reconstructed in the slice segment, according to the control information of the slice segment,
wherein the encoding method further comprises when a current slice segment to be processed is the dependent slice segment, adding, as the control information, both to the header area of the current slice segment
(i) information indicating whether to apply a filter to a slice boundary between (a) a slice including the current slice segment and a neighboring slice segment adjacent to the current slice segment and (b) a neighboring slice adjacent to the slice, and
(ii) information indicating whether to apply a filter to a slice segment boundary between (a) the current slice segment included in the slice and (b) the neighboring slice segment adjacent to the current slice segment and included in the slice.

14. A decoding method of decoding an encoded picture, comprising:
reconstructing a plurality of blocks included in each of a plurality of slice segments included in the encoded picture, the plurality of slice segments including an independent slice segment and a dependent slice segment dependent on the independent slice segment;

obtaining, for each of the plurality of slice segments, control information from a header area of the slice segment, the control information being for controlling application of a filter to the slice segment; and applying, for each of the plurality of slice segments, the filter to the plurality of blocks which have been reconstructed in the slice segment, according to the control information of the slice segment, wherein the decoding method further comprises when a current slice segment to be processed is the dependent slice segment, obtaining, as the control information, from the header area of the current slice segment both (i) information indicating whether to apply a filter to a slice boundary between (a) a slice including the current slice segment and a neighboring slice segment adjacent to the current slice segment and (b) a neighboring slice adjacent to the slice, and (ii) information indicating whether to apply a filter to a slice segment boundary between (a) the current slice segment included in the slice and (b) the neighboring slice segment adjacent to the current slice segment and included in the slice.

* * * * *